US012804706B2

(12) United States Patent
Lei et al.

(10) Patent No.: US 12,804,706 B2
(45) Date of Patent: Nov. 17, 2026

(54) PREAMBLE TO DEMODULATION REFERENCE SIGNAL MAPPING FOR RANDOM ACCESS PROCEDURES

(71) Applicant: Qualcomm Incorporated, San Diego, CA (US)

(72) Inventors: Jing Lei, San Diego, CA (US); Seyong Park, San Diego, CA (US); Linhai He, San Diego, CA (US); Ruiming Zheng, Beijing (CN); Yi Huang, San Diego, CA (US); Tingfang Ji, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 391 days.

(21) Appl. No.: 17/598,329

(22) PCT Filed: Mar. 20, 2020

(86) PCT No.: PCT/CN2020/080326
§ 371 (c)(1),
(2) Date: Sep. 27, 2021

(87) PCT Pub. No.: WO2020/199939
PCT Pub. Date: Oct. 8, 2020

(65) Prior Publication Data

US 2022/0191937 A1 Jun. 16, 2022

(30) Foreign Application Priority Data

Mar. 29, 2019 (WO) ................ PCT/CN2019/080534

(51) Int. Cl.
*H04L 5/00* (2006.01)
*H04L 27/26* (2006.01)
(Continued)

(52) U.S. Cl.
CPC ......... *H04W 74/006* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS

2015/0319779 A1* 11/2015 Li ....................... H04L 27/2613 370/329
2018/0109976 A1* 4/2018 Ly ......................... H04L 1/1893
(Continued)

FOREIGN PATENT DOCUMENTS

CN 108702781 A 10/2018
CN 109286942 A 1/2019
(Continued)

OTHER PUBLICATIONS

U.S. Appl. No. 62/805,524, filed Feb. 14, 2019 to Xiong et al., "On The Association Between PRACH and MsgA PUSCH for 2-Step RACH".*

(Continued)

*Primary Examiner* — Gregory B Sefcheck
(74) *Attorney, Agent, or Firm* — Holland & Hart LLP

(57) ABSTRACT

Methods, systems, and devices for wireless communications are described. A base station may determine a relationship between preamble sequences of a preamble portion of a random access message and resources for demodulation reference signal (DMRS) sequences and physical uplink shared channel (PUSCH) occasions of a payload portion of a random access message. The base station may map some preamble sequences to some of the DMRS sequences and PUSCH payloads within a mapping period. The base station may transmit, to a user equipment (UE), an indication of the
(Continued)

mapping rule between the preamble sequences and the DMRS sequences and payloads. The UE may transmit, based on determining the relationship, at least one preamble sequence in a preamble occasion and at least one DMRS sequence and one payload of the random access message in a PUSCH occasion based on the configured mapping rule.

29 Claims, 18 Drawing Sheets

(51) Int. Cl.

| | |
|---|---|
| ***H04W 74/00*** | (2009.01) |
| ***H04W 74/0833*** | (2024.01) |
| ***H04W 74/0836*** | (2024.01) |

(52) U.S. Cl.

CPC ..... *H04L 27/2613* (2013.01); *H04W 74/0833* (2013.01); *H04L 27/26025* (2021.01); *H04L 27/26136* (2021.01); *H04W 74/0836* (2024.01)

(56) References Cited

U.S. PATENT DOCUMENTS

| | | | | |
|---|---|---|---|---|
| 2019/0059110 | A1* | 2/2019 | Zhang | H04W 16/14 |
| 2019/0075598 | A1* | 3/2019 | Li | H04W 74/0833 |
| 2019/0297577 | A1* | 9/2019 | Lin | H04W 52/0219 |
| 2020/0053757 | A1* | 2/2020 | Bagheri | H04L 5/0053 |
| 2020/0053797 | A1* | 2/2020 | Basu Mallick | H04W 74/0808 |
| 2020/0068497 | A1* | 2/2020 | Gong | H04W 52/42 |
| 2020/0077402 | A1* | 3/2020 | Lei | H04L 1/0003 |
| 2020/0100299 | A1* | 3/2020 | Loehr | H04L 5/0094 |
| 2020/0120713 | A1* | 4/2020 | Yerramalli | H04W 52/50 |
| 2020/0137745 | A1* | 4/2020 | Bachu | H04L 5/001 |
| 2020/0137803 | A1* | 4/2020 | Fakoorian | H04W 56/0045 |
| 2020/0195386 | A1* | 6/2020 | Marinier | H04L 1/1854 |
| 2020/0221503 | A1* | 7/2020 | Kusashima | H04W 74/0833 |
| 2020/0236717 | A1* | 7/2020 | Sun | H04L 5/0044 |
| 2020/0245373 | A1* | 7/2020 | Xiong | H04W 74/0833 |
| 2020/0260485 | A1* | 8/2020 | Lei | H04W 72/23 |
| 2020/0267768 | A1* | 8/2020 | Hakola | H04L 5/0091 |
| 2020/0288506 | A1* | 9/2020 | Lei | H04W 74/0833 |
| 2020/0305202 | A1* | 9/2020 | Zhang | H04W 76/10 |
| 2020/0314917 | A1* | 10/2020 | Jeon | H04W 74/0833 |
| 2020/0404708 | A1* | 12/2020 | Zhang | H04W 74/0808 |
| 2021/0143961 | A1* | 5/2021 | Saito | H04L 5/006 |
| 2021/0176781 | A1* | 6/2021 | Wang | H04W 80/02 |
| 2021/0243814 | A1* | 8/2021 | Zhang | H04W 74/0833 |
| 2021/0307082 | A1* | 9/2021 | Wang | H04W 72/1263 |
| 2021/0410196 | A1* | 12/2021 | Shi | H04W 74/006 |
| 2022/0086915 | A1* | 3/2022 | Canonne-Velasquez | H04W 74/0833 |
| 2022/0124816 | A1* | 4/2022 | Farag | H04L 5/0044 |
| 2022/0159729 | A1* | 5/2022 | Xiong | H04W 72/1268 |

FOREIGN PATENT DOCUMENTS

| | | | |
|---|---|---|---|
| WO | WO-2015166840 | A1 | 11/2015 |
| WO | WO-2016180125 | A1 | 11/2016 |
| WO | WO-2017155324 | A1 | 9/2017 |
| WO | WO-2018177172 | A1 | 10/2018 |
| WO | WO-2019052472 | A1 | 3/2019 |

OTHER PUBLICATIONS

U.S. Appl. No. 62/810,125, filed Feb. 25, 2019 to Xiong et al., "Association Between PRACH and MsgA PUSCH for 2-Step RACH".*

CATT: "Discussion on Channel Structure for 2-Step RACH," 3GPP TSG RAN WG1 Meeting #96, Feb. 25, 2019-Mar. 1, 2019, R1-1902027, Mar. 1, 2019 (Mar. 1, 2019) section 2.1, 5 pages.

CMCC: "Discussion on Channel Structure for Two-step Rach," 3GPP TSG RAN WG1 #96, Feb. 25, 2019-Mar. 1, 2019, R1-1902326, Mar. 1, 2019 (Mar. 1, 2019), the whole document, 3 pages.

International Search Report and Written Opinion—PCT/CN2019/080534—ISA/EPO—Jan. 6, 2020.

International Search Report and Written Opinion—PCT/CN2020/080326—ISA/EPO—Jun. 24, 2020

Qualcomm Incorporated: "Channel Structure for Two-Step RACH", 3GPP Draft, 3GPP TSG-RAN WG1 Meeting #96, R1-1902977, Channel Structure for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600674, pp. 1-10, Retrieved from the Internet: URL: http://www.3gpp.org/ftp/tsg%5Fran/WG1%5FRL1/TSGR1%5F96/Docs/R1%2D1902977%2Ezip, [retrieved on Feb. 16, 2019], section 2.1-section 2.3.

Intel Corporation: Channel Structure for Two-Step RACH, R1-1902466, 3GPP TSG RAN WG1 #96, INTEL Channel Structure, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600162, pp. 1-8, paragraph [0004], figure 3.

Qualcomm Incorporated: "Procedures for Two-Step RACH", 3GPP TSG-RAN WG1 Meeting #96, R1-1902978, Procedures for Two-Step RACH, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600675, pp. 1-9, paragraph [0001]—paragraph [0002], figure 1.

Supplementary European Search Report—EP20784539—Search Authority—Munich—Nov. 25, 2022.

European Search Report—EP26150755—Search Authority—Munich—Apr. 8, 2026.

* cited by examiner

PREAMBLE TO DEMODULATION REFERENCE SIGNAL MAPPING FOR RANDOM ACCESS PROCEDURES

CROSS REFERENCE TO RELATED APPLICATIONS

The present patent application is a 371 national stage filing of International PCT Application No. PCT/CN2020/080326 by Lei et al., entitled "PREAMBLE TO DEMODULATION REFERENCE SIGNAL MAPPING FOR RANDOM ACCESS PROCEDURES," filed Mar. 20, 2020; and claims priority to International PCT Application No. PCT/CN2019/080534 by Lei et al., entitled "PREAMBLE TO DEMODULATION REFERENCE SIGNAL MAPPING FOR RANDOM ACCESS PROCEDURES," filed Mar. 29, 2019, each of which is assigned to the assignee hereof, and each of which is expressly incorporated by reference in its entirety herein.

BACKGROUND

The following relates generally to wireless communications, and more specifically to preamble to demodulation reference signal mapping for random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may connect to a base station based on performing a random access procedure. In some cases, the UE may transmit a random access message and receive, from a base station, a random access response. The base station may configure resources for the UE to transmit the random access message. Techniques for improved random access procedures and related communications are desired.

SUMMARY

The described techniques relate to improved methods, systems, devices, and apparatuses that support mapping for random access procedures, which may include preamble to demodulation reference signal (DMRS) mapping for two-step random access procedures. Generally, the described techniques provide for aggregating preamble sequences associated with one or more random access (e.g., preamble) occasions (ROs) for a random access message and aggregating DMRS sequences of one or more physical uplink shared channel (PUSCH) occasions (POs) for one or more random access messages into groups (e.g., pools). A user equipment (UE) in a wireless communications system may perform a random access procedure to connect to a base station. In some cases, the UE may perform a two-step random access procedure (e.g., a two-step random access channel (RACH) procedure). The UE may transmit a random access message to the base station, and, in response, receive a random access response. The random access message may include a preamble and a payload. The preamble may include a preamble sequence. The payload may include a reference signal (e.g., a DMRS) and one or more uplink shared channel symbols (e.g., PUSCH symbols) in some cases. The preamble sequence may be transmitted in a set of time and frequency resources referred to as an RO, and the payload (e.g., DMRS and PUSCH symbols) may be transmitted a set of time and frequency resources referred to as a PO.

The base station may configure multiple ROs and POs within a period of the random access message. The base station may aggregate preamble sequences and DMRS sequences from the multiple ROs and POs within the period to construct groups (e.g., larger pools) of preamble sequences and DMRS sequences. A mapping relationship (e.g., a mapping rule) may be configured, for example by the base station, between preamble sequences of the preamble group (e.g., pool) to DMRS sequences of the DMRS group (e.g., pool). For example, at least a first preamble sequence of a preamble pool may be mapped to at least a first DMRS sequence of a DMRS pool. The UE may select a preamble sequence for the preamble of the random access message and then select a corresponding DMRS sequence and PUSCH time/frequency resources (e.g., a PUSCH occasion) for the payload of the random access message based on a mapping (e.g., between the selected preamble sequence and corresponding DMRS sequence, or more generally based on mappings related to one or more preamble sequences and one or more DMRS sequences). The mapping rule may, for example, map one preamble sequence to one DMRS sequence (e.g., one-to-one mapping), one preamble sequence to multiple DMRS sequences (e.g., one-to-many mapping), or multiple preamble sequences to one DMRS sequence (e.g., many-to-one mapping). The base station may configure one or more of the mapping rules for preamble sequences and DMRS sequences within a period of the random access message. Additional techniques for adapting mapping rules based on pool size and/or RO sharing (e.g., an RO is shared by two-step RACH and four-step RACH) are also described herein.

A method of wireless communications at a base station is described. The method may include identifying configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions, determining, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message, mapping, based on determining the mapping rule, at least some of the aggregated set of preamble sequences in the first group and at least some of the aggregated set of DMRS sequences and PUSCH occasions for the payloads of the random access message in the second group, and transmitting, to a UE, an indication of the mapping rule between the preamble sequences and the DMRS sequences and PUSCH occasions for the payloads of the random access message.

An apparatus for wireless communications at a base station is described. The apparatus may include a processor, memory in electronic communication with the processor, and instructions stored in the memory. The instructions may be executable by the processor to cause the apparatus to identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions, determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message, map, based on determining the mapping rule, at least some of the aggregated set of preamble sequences in the first group and at least some of the aggregated set of DMRS sequences and PUSCH occasions for the payloads of the random access message in the second group, and transmit, to a UE, an indication of the mapping rule between the preamble sequences and the DMRS sequences and PUSCH occasions for the payloads of the random access message.

Another apparatus for wireless communications at a base station is described. The apparatus may include means for identifying configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions, determining, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message, mapping, based on determining the mapping rule, at least some of the aggregated set of preamble sequences in the first group and at least some of the aggregated set of DMRS sequences and PUSCH occasions for the payloads of the random access message in the second group, and transmitting, to a UE, an indication of the mapping rule between the preamble sequences and the DMRS sequences and PUSCH occasions for the payloads of the random access message.

A non-transitory computer-readable medium storing code for wireless communications at a base station is described. The code may include instructions executable by a processor to identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions, determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message, map, based on determining the mapping rule, at least some of the aggregated set of preamble sequences in the first group and at least some of the aggregated set of DMRS sequences and PUSCH occasions for the payloads of the random access message in the second group, and transmit, to a UE, an indication of the mapping between the preamble sequences and the DMRS sequences and PUSCH occasions for the payloads of the random access message.

In some examples of the method, apparatuses, and non-transitory computer-readable medium described herein, mapping the aggregated set of preamble sequences and the aggregated set of DMRS sequences and PUSCH occasions of the random access message may include operations, features, means, or instructions for selecting a first preamble sequence from the aggregated set of preamble sequences and a second DMRS sequence and a second PUSCH occasion for the payload of the random access message from the aggregated set of DMRS sequences and PUSCH occasions for the payloads of the random access message, where the payload portion of the random access message is mapped to the PUSCH occasion and the DMRS is used for demodulating the payload portion of the random access message.

Some examples of the method, apparatuses, and non-transitory computer-readable medium described herein may further include operations, features, means, or instructions for monitoring, based on the mapping rule and the mapping, one or more preamble occasions for at least one preamble sequence of the aggregated set of preamble sequences and one or more PUSCH occasions for at least one DMRS sequence and PUSCH occasions for the payload of the random access message of the aggregated set of DMRS sequences and PUSCH occasions for the payloads of the random access message.

Some examples of the method, apparatuses, and non-transitory computer-readable medium described herein may further include operations, features, means, or instructions for transmitting, to the UE, a random access response message based on monitoring the one or more preamble occasions and the one or more PUSCH occasions.

Some examples of the method, apparatuses, and non-transitory computer-readable medium described herein may further include operations, features, means, or instructions for determining the first group of preamble sequences based on determining a number of preamble sequences for one or more preamble occasions of a total number of preamble occasions, and determining the second group of DMRS sequences and payloads of the random access message based on determining a number of random access payload configurations of the random access message for one or more PUSCH occasions of a total number of PUSCH occasions.

Some examples of the method, apparatuses, and non-transitory computer-readable medium described herein may further include operations, features, means, or instructions for receiving the configuration information for the random access message from a network device, the configuration information being based on a cell deployment, a duplexing mode, or a potential radio resource control state of the UE, or any combination thereof, where identifying the configuration information may be based on receiving the configuration information.

In some examples of the method, apparatuses, and non-transitory computer-readable medium described herein, the mapping may include operations, features, means, or instructions for mapping each preamble sequence in the first group to a resource for transmitting a respective DMRS sequence and PUSCH occasion for the payload of the random access message in the second group.

In some examples of the method, apparatuses, and non-transitory computer-readable medium described herein, the mapping may include operations, features, means, or instructions for mapping each preamble sequence in the first group to respective resources for transmitting DMRS sequences and PUSCH occasions for the payloads of the random access message in the second group.

Some examples of the method, apparatuses, and non-transitory computer-readable medium described herein may further include operations, features, means, or instructions for determining, based on one or more preamble sequences in the first group, a waveform, a resource allocation, or both, associated with a set of PUSCH occasions for the payloads of the random access message of the payloads of the random access message in the second group.

In some examples of the method, apparatuses, and non-transitory computer-readable medium described herein, the mapping may include operations, features, means, or instructions for mapping a set of preamble sequences in the first group to a resource for transmitting a single DMRS sequence and PUSCH occasion for the payload of the random access message in the second group.

Some examples of the method, apparatuses, and non-transitory computer-readable medium described herein may further include operations, features, means, or instructions for determining, based on the set of preamble sequences in the first group, a set of transmission parameters for the single DMRS sequence and payload of the random access message associated with the resource for transmitting the single DMRS sequence and PUSCH occasion for the payload of the random access message.

Some examples of the method, apparatuses, and non-transitory computer-readable medium described herein may further include operations, features, means, or instructions for applying a first mapping rule for a first preamble sequence and a second mapping rule for a second preamble sequence within the period of the random access message, the first mapping rule and the second mapping rule being different.

In some examples of the method, apparatuses, and non-transitory computer-readable medium described herein, the period of the random access message may be based on the configuration information that may be associated with a two-step random access procedure.

In some examples of the method, apparatuses, and non-transitory computer-readable medium described herein, the mapping may be based on a dual connectivity, a carrier aggregation, or a supplemental uplink deployment of the UE.

Some examples of the method, apparatuses, and non-transitory computer-readable medium described herein may further include operations, features, means, or instructions for ordering the first group based on corresponding preamble sequence identifiers for the preambles and the second group based on the corresponding DMRS sequence identifier and random access payload identifiers.

In some examples of the method, apparatuses, and non-transitory computer-readable medium described herein, transmitting the indication of the mapping rule may include operations, features, means, or instructions for transmitting the indication of the mapping in a system information block or a radio resource control message.

Some examples of the method, apparatuses, and non-transitory computer-readable medium described herein may further include operations, features, means, or instructions for transmitting an indication for a mapping rule adaptation to the UE.

In some examples of the method, apparatuses, and non-transitory computer-readable medium described herein, the mapping rule, or the indication for the mapping rule adaptation, or both may be based on a size of the first group, a size of the second group, a type of the random access procedure, a traffic load for the base station, or any combination thereof.

Some examples of the method, apparatuses, and non-transitory computer-readable medium described herein may further include operations, features, means, or instructions for identifying a first preamble sequence of the aggregated set of preamble sequences configured for a 2-step random access procedure, where the first preamble sequence may be associated with a separate preamble occasion, and identifying a second preamble sequence of the aggregated set of preamble sequences configured for a 2-step random access procedure and a 4-step random access procedure, where the second preamble sequence may be associated with a shared preamble occasion used by both a two-step random access UE and a four-step random access UE.

Some examples of the method, apparatuses, and non-transitory computer-readable medium described herein may further include operations, features, means, or instructions for mapping the first preamble sequence to a set of resources for transmitting DMRS sequences and PUSCH occasions for the payloads of the random access message.

Some examples of the method, apparatuses, and non-transitory computer-readable medium described herein may further include operations, features, means, or instructions for mapping the second preamble sequence to a corresponding set of resources for transmitting DMRS sequences and PUSCH occasions for the payloads of the random access message.

Some examples of the method, apparatuses, and non-transitory computer-readable medium described herein may further include operations, features, means, or instructions for identifying a third preamble sequence of the aggregated set of preamble sequences configured for the 2-step random access procedure and the 4-step random access procedure, and mapping the second preamble sequence and the third preamble sequence to a set of resources for transmitting DMRS sequences and PUSCH occasions for the payloads of the random access message.

Some examples of the method, apparatuses, and non-transitory computer-readable medium described herein may further include operations, features, means, or instructions for resourcing sizes of a preamble occasion for at least one preamble sequence and a PUSCH occasion for at least one DMRS sequence and at least one payload of the random access message may be based on the configuration information.

In some examples of the method, apparatuses, and non-transitory computer-readable medium described herein, at least some of the payloads of the random access message in the second group include a DMRS sequence and a PUSCH symbol.

Some examples of the method, apparatuses, and non-transitory computer-readable medium described herein may further include operations, features, means, or instructions for receiving the configuration information from a network entity, where the mapping may be based on receiving the configuration information from the network entity.

In some examples of the method, apparatuses, and non-transitory computer-readable medium described herein, transmitting the indication of the mapping may include operations, features, means, or instructions for transmitting, to the UE, the indication of the configuration information for the random access message of the random access procedure.

In some examples of the method, apparatuses, and non-transitory computer-readable medium described herein, the first group of preamble sequences includes the entire aggregated set of preamble sequences and the second group of resources for payloads of the random access message includes the entire aggregated set of DMRS sequences and payloads of the random access message.

In some examples of the method, apparatuses, and non-transitory computer-readable medium described herein, the first group and the second group correspond to one or more preamble occasions and one or more PUSCH occasions.

In some examples of the method, apparatuses, and non-transitory computer-readable medium described herein, the mapping rule between the first group of preamble sequences and the second group of resources for DMRS sequences and payloads of the random access message includes an aggregation rule.

A method of wireless communications at a UE is described. The method may include receiving, from a base station, an indication of a mapping between an aggregated set of preamble sequences and an aggregated set of DMRS sequences and PUSCH resources of a random access message of a random access procedure, determining, based on the indication of the mapping, a mapping rule between a first group of preamble resources including at least a part of the aggregated set of preamble resources and a second group of resources for payloads of the random access message including at least a part of the aggregated set of DMRS sequences and PUSCH occasions, wherein the first group and the second group are associated with a resource mapping period of the random access message, and transmitting, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

An apparatus for wireless communications at a UE is described. The apparatus may include a processor, memory in electronic communication with the processor, and instructions stored in the memory. The instructions may be executable by the processor to cause the apparatus to receive, from a base station, an indication of a mapping between an aggregated set of preamble sequences and an aggregated set of DMRS sequences and PUSCH resources of a random access message of a random access procedure, determine, based on the indication of the mapping, a mapping rule between a first group of preamble resources including at least a part of the aggregated set of preamble resources and a second group of resources for payloads of the random access message including at least a part of the aggregated set of DMRS sequences and PUSCH occasions, wherein the first group and the second group are associated with a resource mapping period of the random access message, and transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

Another apparatus for wireless communications at a UE is described. The apparatus may include means for receiving, from a base station, an indication of a mapping between an aggregated set of preamble sequences and an aggregated set of DMRS sequences and PUSCH resources of a random access message of a random access procedure, determining, based on the indication of the mapping, a mapping rule between a first group of preamble resources including at least a part of the aggregated set of preamble resources and a second group of resources for payloads of the random access message including at least a part of the aggregated set of DMRS sequences and PUSCH occasions, wherein the first group and the second group are associated with a resource mapping period of the random access message, and transmitting, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

A non-transitory computer-readable medium storing code for wireless communications at a UE is described. The code may include instructions executable by a processor to receive, from a base station, an indication of a mapping between an aggregated set of preamble sequences and an aggregated set of DMRS sequences and PUSCH resources of a random access message of a random access procedure, determine, based on the indication of the mapping, a mapping rule between a first group of preamble resources including at least a part of the aggregated set of preamble resources and a second group of resources for payloads of the random access message including at least a part of the aggregated set of DMRS sequences and PUSCH occasions, wherein the first group and the second group are associated with a resource mapping period of the random access message, and transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

Some examples of the method, apparatuses, and non-transitory computer-readable medium described herein may further include operations, features, means, or instructions for identifying configuration information for the random access message, the configuration information associated with the aggregated set of preamble sequences and the aggregated set of DMRS sequences and PUSCH occasions of the random access message, where determining the mapping rule between the first group and the second group may be based on identifying the configuration information.

Some examples of the method, apparatuses, and non-transitory computer-readable medium described herein may further include operations, features, means, or instructions for receiving the configuration information for the random access message from the base station, the configuration information being based on a cell deployment, a duplexing mode, or a potential radio resource control state of the UE, or any combination thereof.

In some examples of the method, apparatuses, and non-transitory computer-readable medium described herein, the period of the random access message may be based on the configuration information.

Some examples of the method, apparatuses, and non-transitory computer-readable medium described herein may further include operations, features, means, or instructions for accessing stored mapping configuration information in memory of the UE based on the indication of the mapping, where the determining may be based on accessing the stored mapping configuration information.

Some examples of the method, apparatuses, and non-transitory computer-readable medium described herein may further include operations, features, means, or instructions for determining a mapping of each preamble sequence in the first group to resources for a respective DMRS sequence and payload of the random access message in the second group, where the transmitting includes transmitting a preamble sequence in the first group and a DMRS sequence and a payload in the second group based on determining the mapping.

Some examples of the method, apparatuses, and non-transitory computer-readable medium described herein may further include operations, features, means, or instructions for determining a mapping of each preamble sequence in the first group to resources for transmitting pluralities of DMRS sequences and payloads of the random access message in the second group, where the transmitting includes transmitting a preamble sequence in the first group and one of the respective pluralities of DMRS sequences and payloads of the random access message in the second group based on determining the mapping.

Some examples of the method, apparatuses, and non-transitory computer-readable medium described herein may further include operations, features, means, or instructions for transmitting, with the preamble sequence in the first group, an indication of a waveform, a resource allocation, or both, associated with the set of DMRS sequences and PUSCH occasion for the payloads of the random access message in the second group.

Some examples of the method, apparatuses, and non-transitory computer-readable medium described herein may further include operations, features, means, or instructions for determining a mapping of each respective set of preamble sequences in the first group to a respective DMRS sequence and PUSCH occasion of the random access message in the second group, where the transmitting includes transmitting one of the pluralities of preamble sequences in the first group and the respective DMRS sequence and PUSCH occasions for the payload of the random access message in the second group based on determining the mapping.

Some examples of the method, apparatuses, and non-transitory computer-readable medium described herein may further include operations, features, means, or instructions for transmitting, with the one of the pluralities of preamble sequences in the first group, an indication for a set of transmission parameters for the respective DMRS sequence and payload in the second group.

Some examples of the method, apparatuses, and non-transitory computer-readable medium described herein may further include operations, features, means, or instructions for determining a first mapping rule for a first preamble sequence and a second mapping rule for a second preamble sequence within the resource mapping period of the random access message, where the first mapping rule and the second mapping rule may be different, and where transmitting the preamble sequence in the first group and the DMRS sequence and payload in the second group may be based on determining the first mapping rule and the second mapping rule.

In some examples of the method, apparatuses, and non-transitory computer-readable medium described herein, the mapping may be based on a dual connectivity, a carrier aggregation, or a supplemental uplink deployment of the UE.

Some examples of the method, apparatuses, and non-transitory computer-readable medium described herein may further include operations, features, means, or instructions for ordering the first group based on corresponding preamble sequence identifiers for the preamble sequences and the second group based at least in part corresponding DMRS sequence identifiers and random access payload identifiers for the payloads of the random access message.

In some examples of the method, apparatuses, and non-transitory computer-readable medium described herein, the indication of the mapping may be received in a system information block or a radio resource control message.

Some examples of the method, apparatuses, and non-transitory computer-readable medium described herein may further include operations, features, means, or instructions for receiving an indication of a mapping rule adaptation from the base station, and applying the mapping rule adaptation to the mapping, where at least one of the determining the mapping rule or transmitting the at least one preamble sequence and the at least one DMRS sequence and PUSCH occasions for the payload of the random access message may be based on applying the mapping rule adaptation.

In some examples of the method, apparatuses, and non-transitory computer-readable medium described herein, the mapping rule adaptation may be based on a first type of random access procedure for a first preamble sequence of the aggregated set of preamble sequences, a second type of random access procedure for a second preamble sequence of the aggregated set of preamble sequences, or both, where the first type and the second type may be different.

In some examples of the method, apparatuses, and non-transitory computer-readable medium described herein, at least some of the DMRS sequences and PUSCH occasions of the random access message in the second group include a DMRS sequence and a PUSCH symbol.

DETAILED DESCRIPTION

Figure 1:
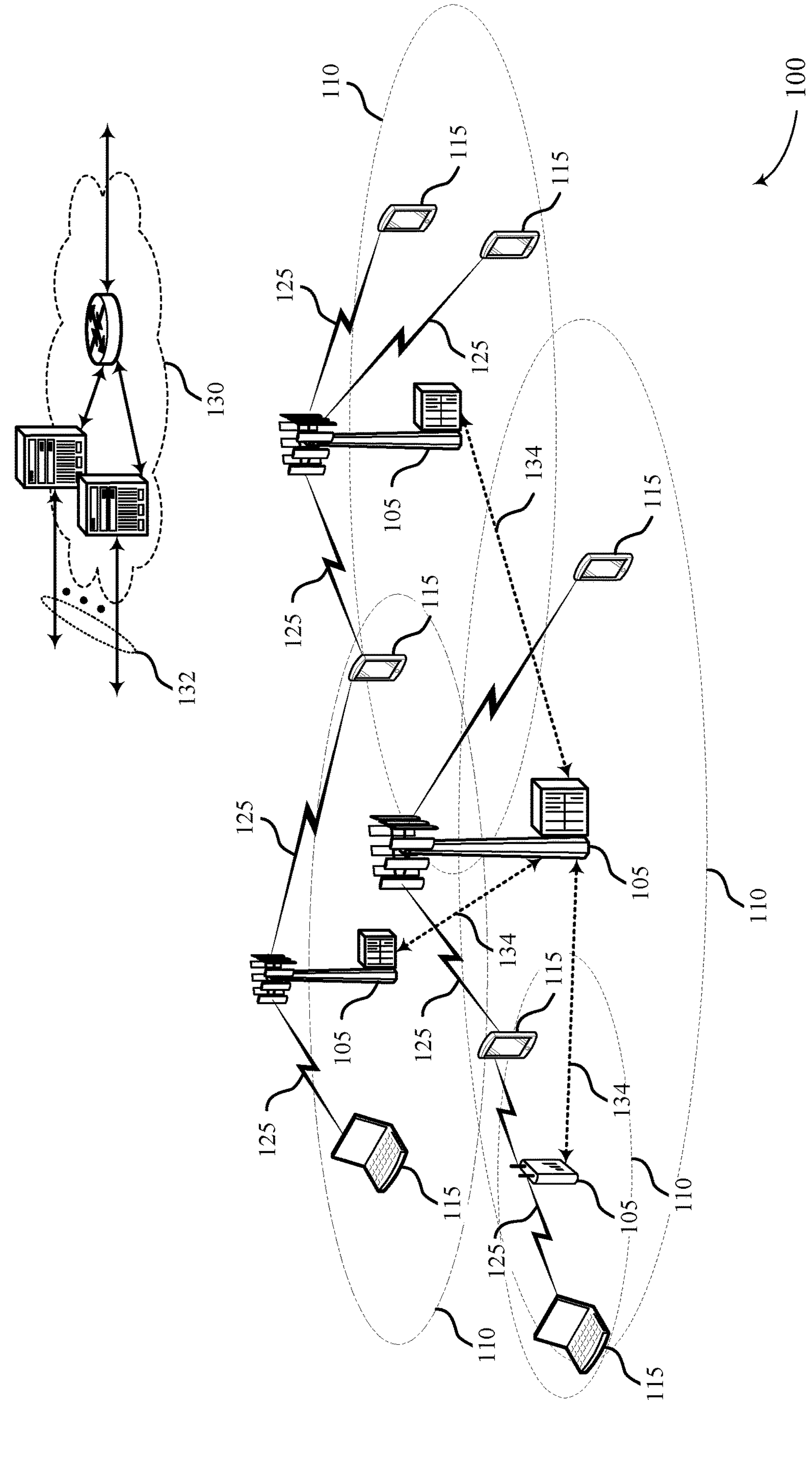
FIG. 1 illustrates an example of a system for wireless communications that supports preamble to demodulation reference signal mapping for random access procedures in accordance with aspects of the present disclosure.

A user equipment (UE) in a wireless communications system may perform a random access procedure to connect to a base station. In some cases, the UE may perform a two-step random access procedure (e.g., a two-step random access channel (RACH) procedure). The UE may transmit a random access message to the base station, and, in response, the base station may transmit a random access response. The random access message may include a preamble and a payload. The preamble may include a preamble sequence, and the UE may first transmit the preamble. The payload may include a reference signal (e.g., a demodulation reference signal (DMRS)) and one or more uplink shared channel symbols (e.g., physical uplink shared channel (PUSCH) symbols). The preamble sequence may be transmitted in a set of time and frequency resources referred to as a RACH occasion (RO), and the payload (e.g., at least one reference signal, such as a DMRS, and at least one PUSCH symbol) may be transmitted in a set of time and frequency resources referred to as a PUSCH occasion (PO). The base station may configure one or more ROs and one or more POs for the random access message. By configuring multiple ROs and POs (e.g., groups), the probability of two UEs performing a random access procedure and colliding or interfering with each other may be decreased.

Configuring too many ROs and POs such that several of these resources are unused, however, may decrease a resource utilization of the wireless communications system. Therefore, the base station and UE may implement techniques for a configurable tradeoff between collision probability and resource utilization as disclosed herein.

A base station and a UE described herein may support techniques for configuring a group (e.g., pool) of preamble sequences and a group (e.g., pool) of DMRS sequences. The base station may configure multiple ROs and POs within a period of the random access message. The base station may aggregate preamble sequences and DMRS sequences from the multiple ROs and POs within the period to construct larger groups of preamble sequences and DMRS sequences. In some cases, the configurations of ROs and POs, and the corresponding configurations for the preamble pool and DMRS pool, may be based on a deployment, duplexing mode, and RRC state of the UE.

A device, such as the base station, may configure a mapping relationship (e.g., a mapping rule) between preamble sequences of the preamble pool to DMRS sequences of the DMRS pool and the corresponding time/frequency resources for transmitting a payload of the random access message. For example, at least a first preamble sequence of the preamble pool may be mapped to at least a first DMRS sequence of the DMRS pool. The UE may select a preamble sequence for the preamble of the random access message and then select a corresponding DMRS sequence and PUSCH time/frequency resources for the payload of the random access message based on a mapping, such as a mapping (e.g., a relationship) between the selected preamble sequence and corresponding DMRS sequence. The mapping rule may, for example, map one preamble sequence to one DMRS sequence (e.g., one-to-one), one preamble sequence to multiple DMRS sequences (e.g., one-to-many), or multiple preamble sequences to one DMRS sequence (e.g., many-to-one). The base station may configure one or more of the mapping rules for preamble sequences and DMRS sequences within a period (e.g., a resource mapping period) of the random access message. Additional techniques for adapting mapping rules based on pool size and RO sharing (e.g., an RO is shared by two-step RACH and four-step RACH) are also described herein.

Aspects of the disclosure are initially described in the context of a wireless communications system. Aspects of the disclosure are further illustrated by and described with reference to apparatus diagrams, system diagrams, and flowcharts that relate to preamble to demodulation reference signal mapping for random access procedures.

FIG. 1 illustrates an example of a wireless communications system 100 that supports preamble to demodulation reference signal mapping for random access procedures in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30{,}720{,}000$ seconds. Time intervals of a communications resource may be organized according to radio frames each having a duration of 10 milliseconds (ms), where the frame period may be expressed as $T_f=307{,}200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may configure multiple ROs and POs within a period of a random access message for a UE 115. The base station 105 may aggregate preamble sequences and DMRS sequences from the multiple ROs and POs within the period to construct larger groups (e.g., pools) of preamble sequences and DMRS sequences. The base station 105 may configure a mapping rule between preamble sequences of the preamble pool to DMRS sequences of the DMRS pool. For example, at least a first preamble sequence of the preamble pool may be mapped to at least a first DMRS sequence of the DMRS pool. The UE 115 may select a preamble sequence for the preamble of the random access message and select a corresponding DMRS sequence and PUSCH time/frequency resources for the payload of the random access message based on a mapping between the selected preamble sequence and corresponding DMRS sequence. The mapping rule may, for example, map one preamble sequence to one DMRS sequence (e.g., one-to-one), one preamble sequence to multiple DMRS sequences (e.g., one-to-many), or multiple preamble sequences to one DMRS sequence (e.g., many-to-one). The base station 105 may configure one or more of the mapping rules for preamble sequences and DMRS sequences within a period of the random access message.

Figure 2:
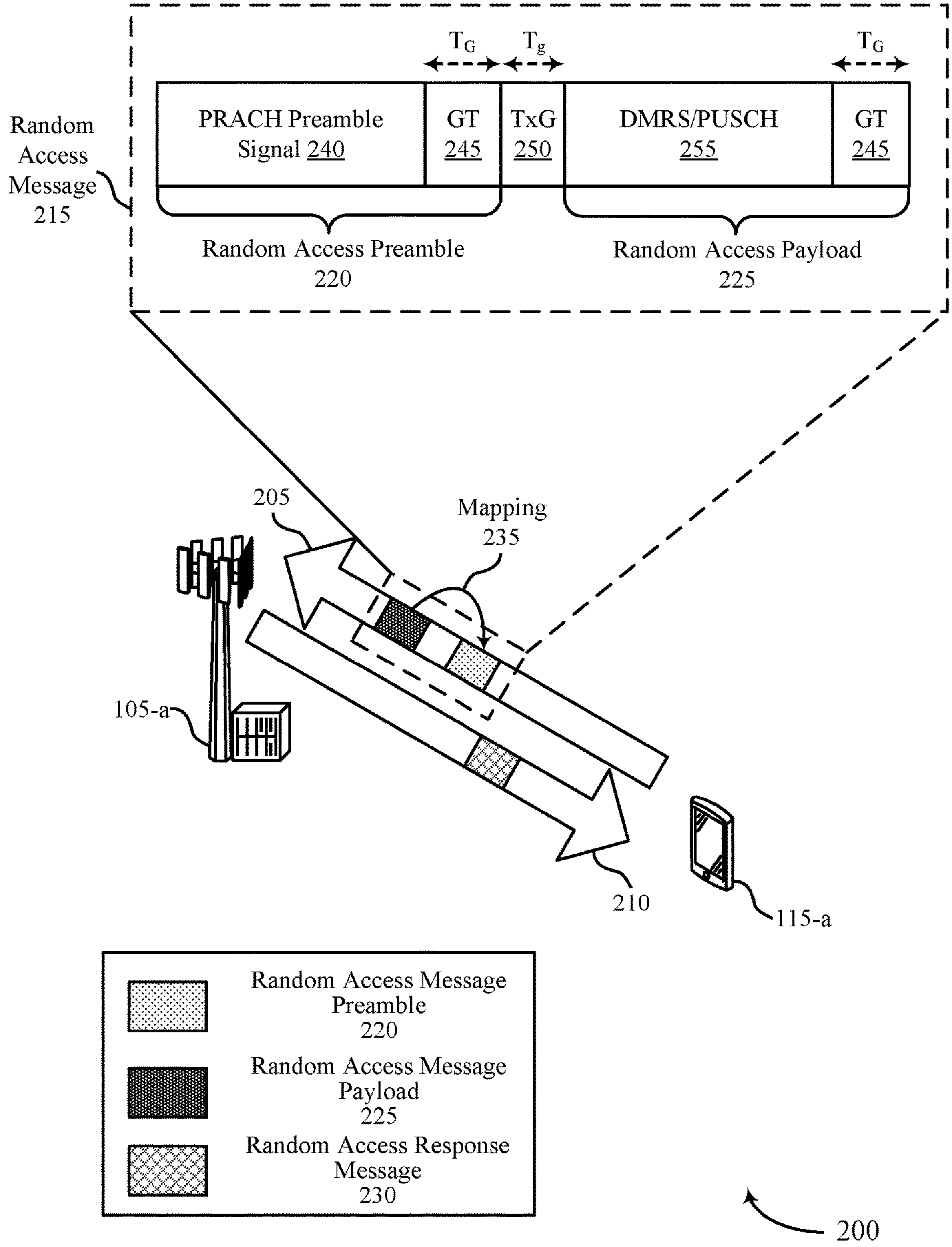
FIG. 2 illustrates an example of a wireless communications system that supports preamble to demodulation reference signal mapping for random access procedures in accordance with aspects of the present disclosure.

FIG. 2 illustrates an example of a wireless communications system 200 that supports preamble to demodulation reference signal mapping for random access procedures in accordance with aspects of the present disclosure. In some examples, wireless communications system 200 may implement aspects of wireless communications system 100.

The wireless communications system 200 may include UE 115-*a* and base station 105-*a*, which may be respective examples of a UE 115 and a base station 105. UE 115-*a* may perform a random access procedure (e.g., a RACH procedure) to establish a connection with base station 105-*a*. To transmit a random access message and initiate the random access procedure, UE 115-*a* may first identify information, such as synchronization information, for base station 105-*a* and some system information for the wireless communications system 200. Base station 105-*a* may transmit (e.g., periodically) synchronization information and system information in a synchronization signal block (SSB) and a system information block (SIB), respectively. In some cases, the synchronization information and system information may be transmitted in an SSB/physical broadcast channel (PBCH) block (e.g., an SS/PBCH block). Base station 105-*a* may transmit demodulation reference signals (DMRSs) in the PBCH to assist UE 115-*a* in decoding the SS/PBCH block and synchronizing with base station 105-*a*. In some cases, UE 115-*a* may measure the DMRS of the PBCH.

An SSB may include some synchronization information or signaling that UE 115-*a* may use to synchronize downlink communications from base station 105-*a*. For example, the SSB may include a primary synchronization signal (PSS), a secondary synchronization signal (SSS), and a PBCH. The PBCH may include a master information block (MIB), which may include information indicating a location of an SIB or multiple SIBs. In some cases, the SIB of the PBCH (e.g., a SIB1) may include information, such as a RACH or PRACH configuration, regarding transmission opportunities (e.g., resources in time and frequency) for UE 115-*a* to transmit, receive, or both, signaling for the random access procedure.

Some other wireless communications systems may support only a four-step random access procedure. In a four-step random access procedure, a UE 115 may determine a random access channel configuration (e.g., from a SIB) and transmit a random access preamble to a base station 105. The base station 105 may transmit a preamble reply in response. In a third step of the four-step random access procedure, the UE 115 may transmit an RRC connection request. The base station 105 may transmit an RRC connection reply. Upon receipt of the RRC connection reply, the UE 115 may then be connected to the base station 105.

Wireless communications system 200 may support a two-step random access procedure (e.g., in addition to a four-step random access procedure). In a two-step random access procedure, UE 115-*a* may transmit a random access message 215 to base station 105-*a*, and base station 105-*a* may transmit a random access response 230 to UE 115-*a* in response. The random access message 215 may include a random access preamble 220 and a random access payload 225. In some examples, the random access message 215 may be an example of a msgA of some random access procedures, and the random access response 230 may be an example of a msgB of the random access procedures. In some examples, a two-step random access procedure may be referred to as a Type-2 random access procedure.

The random access preamble 220 may include, for example, a PRACH preamble signal 240 and a guard period 245. The random access preamble 220 may be processed by base station 105-*a* to determine, for example, a timing offset estimation and DMRS detection assistance. For example, the random access preamble 220 may assist base station 105-*a* in detecting DMRS based on a given mapping function and reducing complexity or uncertainty during blind detection.

The random access payload 225 may include, for example, a DMRS/PUSCH transmission 255 and a guard period 245. Upon detecting the preamble signal 240 of the random access preamble 220 and receiving the random access payload 225, base station 105-*a* may perform channel estimation of the uplink channel and receive the PUSCH transmission from UE 115-*a*. The PUSCH transmission may include information related to an identity of UE 115-*a*, an RRC connection request, user plane data, or any combination thereof, or additional information. In some cases, there may be a transmission gap 250 between the random access preamble 220 and the random access payload 225. For example, in some cases the random access preamble 220 and the random access payload 225 may be contiguous, or they may be separated by some time period (e.g., one or more symbol periods).

Once base station 105-*a* receives and decodes the random access message 215, base station 105-*a* may transmit a random access response 230. Therefore, in the two-step random access procedure, the random access message 215 may be the first step, and the random access response 230 may be the second step. Upon receiving and decoding the random access response 230, UE 115-*a* may be connected to base station 105-*a*.

The time and frequency resources for transmitting a random access preamble 220 may be referred to as a RACH occasion (RO). The time and frequency resources for transmitting a random access payload 225 of the random access message 215 (e.g., for transmitting both the DMRS sequence and PUSCH symbols) may be referred to as a PUSCH occasion (e.g., a PO).

In some wireless communications systems supporting two-step random access procedures, there may be a certain number of preamble sequences and DMRS ports. For example, there may be up to 64 orthogonal/quasi-orthogonal preamble sequences for each RO and up to 12 DMRS ports configured for each PO. The more ROs and POs a base station 105 configures, the less likely it is that two UEs 115 would select the same RO and PO resulting in a transmission collision. Therefore, the more RO and PO configurations, the lower probability of a collision. However, there may be a tradeoff between collision probability and resource utilization. If a base station 105 configures too many ROs and POs, such that many of the configured ROs and POs are not used, this may lead to a low resource utilization for the system, as those resources could be used for other purposes. As a system which supports at least two-step random access procedures, wireless communications system 200 may implement techniques to achieve a configurable tradeoff between collision probability and resource utilization such that collision probability is low while resource utilization can still be high.

For example, base station 105-*a* and UE 115-*a* may support a pool configuration for preamble sequences and DMRS. Multiple POs and ROs may be configured within a transmission period of the random access message 215. The PO and RO may be placed within a time-frequency resource grid by being time-division duplexed or frequency-division duplexed. Within the period of the random access message 215, preamble sequences and DMRSs from multiple ROs and POs may be aggregated to construct a larger pool size. By pooling the preamble sequences and DMRSs from multiple ROs and POs, the wireless communications system may still configure multiple ROs and POs to reduce a probability of collision while increasing resource utilization. Base station 105-*a* may apply an aggregation rule when determining the pool of preamble sequences and pool of resources for payload of the random access messages. The configuration of the ROs and POs may be signaled to UE 115-*a* via SI or RRC signaling.

In some cases, the periodicity (e.g., the period of the random access message 215) and resource size of ROs and POs may be different. For example, the periodicity and resource sizes may change based on a cell deployment of UE 115-*a*, a duplexing mode of UE 115-*a*, and an RRC state of UE 115-*a*. In some cases, only UE 115-*a* may know its RRC state, but base station 105-*a* may estimate the RRC state of UE 115-*a*. For example, base station 105-*a* may estimate the RRC state of UE 115-*a* based on a percentage of UEs 115 in the various RRC states, positioning information of UE 115-*a*, last known information of UE 115-*a*, etc. Base station 105-*a* may use this configuration information when configuring the ROs and POs of the pool configuration.

In an example, within one transmit period of the random access message, base station 105-*a* may configure a pool size of M ROs and Q POs. $M_i$ may correspond to a number of distinct preamble sequences in the ith RO. In some cases, $M_i$ may be less than or equal to a configured number of preamble sequences (e.g., 64 preamble sequences) based on a random access procedure preamble configuration or design. $N_R$ may correspond to a total number of ROs for aggregation. $Q_j$ may correspond to a number of distinctive DMRS sequences on the jth PO. In some cases, $Q_j$ may be less than or equal to a configured number of DMRS sequences (e.g., 12 DMRS sequences) based on a DMRS configuration or design. $N_p$ may correspond to a total number of POs for aggregation. Therefore, the size of the aggregated pool for the preamble sequences, $$M=\sum_{i=1}^{NR} M_i.$$

The size of the aggregated pool for DMRS, $$Q=\sum_{j=1}^{NP} Q_j.$$

The wireless communications system 200 may support techniques for a mapping 235 between a preamble sequence and a reference signal sequence. A DMRS may be an example of the reference signal sequence (e.g., such that the reference signal sequence may be a DMRS sequence). A mapping rule between preambles and payloads may be configured based on the aggregated pools for preamble sequences and DMRS sequences. For example, UE 115-*a* may select a preamble from the aggregated pool of preamble sequences to transmit in an RO, then select an associated DMRS sequence from the aggregated pool of DMRSs to transmit in a corresponding PO. The selected DMRS may correspond to time and frequency resources of a PUSCH occasion for transmitting the DMRS and PUSCH uplink symbols. For example, $\mathbb{S}$ may be the aggregated pool for the preamble sequences with a pool size M, and $\mathbb{S}$ may be the aggregated pool for DMRS with pool size Q. Generally, the wireless $\mathbb{D}$communications system may support at least a one-to-one mapping rule, a one-to-many mapping rule, and a many-to-one mapping rule for applying a mapping function $f$, where $f$ maps $\mathbb{S}$ to $\mathbb{D}$, or $f:\mathbb{S}\rightarrow\mathbb{D}$. The mapping techniques and various mapping rules, or adaptations to the mapping rules, are described in more detail in FIG. 4.

Figure 3:
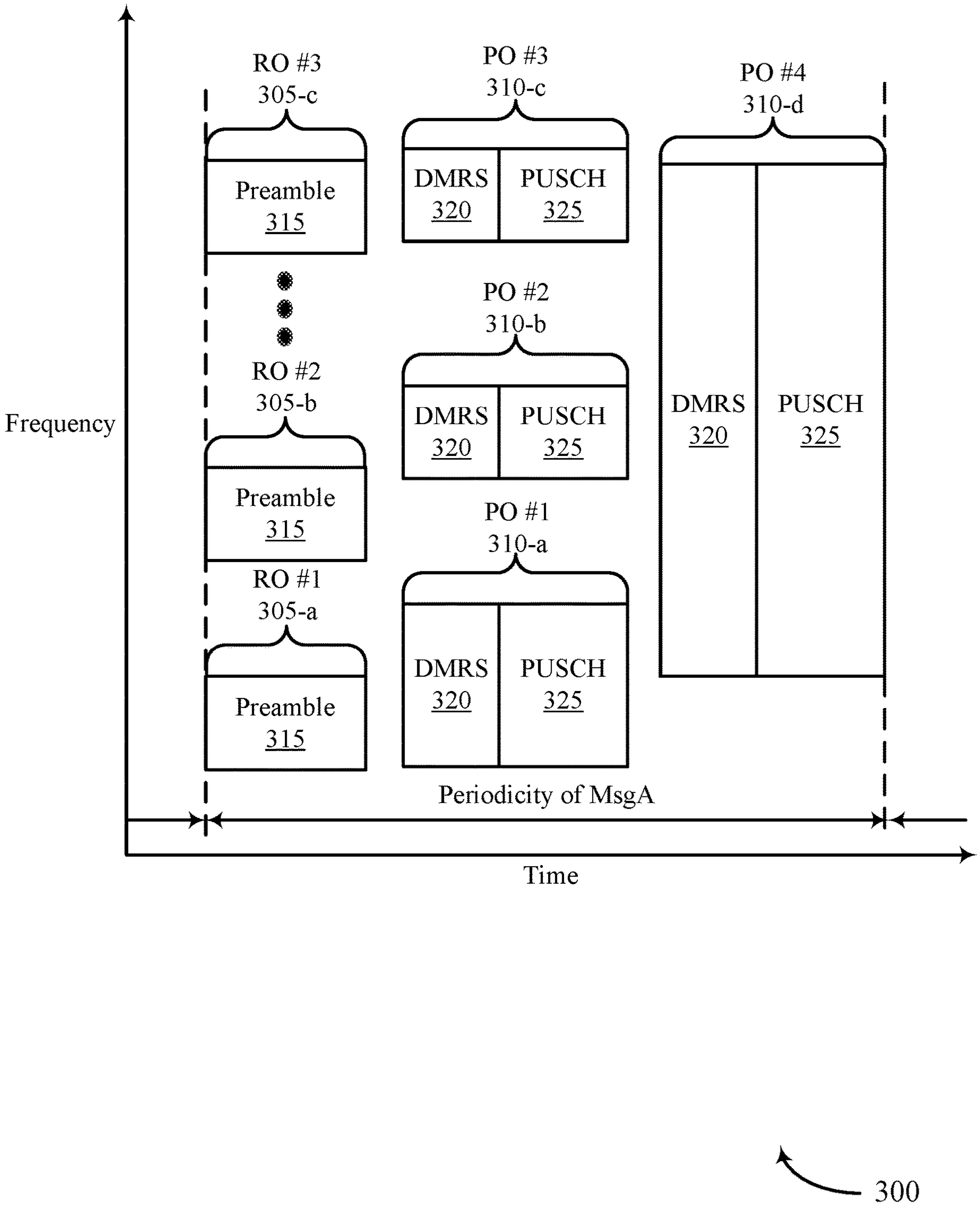
FIG. 3 illustrates an example of a random access message resource configuration that supports preamble to demodulation reference signal mapping for random access procedures in accordance with aspects of the present disclosure.

FIG. 3 illustrates an example of a random access message resource configuration 300 that supports preamble to demodulation reference signal mapping for random access procedures in accordance with aspects of the present disclosure. In some examples, random access message resource configuration 300 may implement aspects of wireless communications system 100.

As described with reference to FIG. 2, some wireless communications systems may support a two-step random access procedure. In a two-step random access procedure, a UE 115 may transmit a random access message to a base station 105, and the base station 105 may transmit a random access response to the UE 115 in response. The random access message may include a preamble and a payload for the random access message. In some examples, the random access message may be an example of a msgA of some random access procedures, and the random access response may be an example of a msgB of the random access procedures. The preamble for the random access message may include a PRACH preamble sequence 315. The payload for the random access message may include a DMRS sequence 320 and one or more PUSCH symbols 325.

The time and frequency resources for transmitting a preamble of the random access message may be an example of an RO 305. The time and frequency resources for transmitting a payload of the random access message (e.g., for transmitting both the DMRS sequence and PUSCH symbols) may be an example of a PO 310. In some wireless communications systems supporting two-step random access procedures, there may be a certain number of preamble sequences and DMRS ports. For example, there may be up to 64 orthogonal/quasi-orthogonal preamble sequences configured for each RO 305 and up to 12 DMRS ports configured for each PO 310.

In an example, a UE 115 may transmit a preamble for a random access message in an RO 305 and transmit a payload for the random access message in a corresponding PO 310. For example, the UE 115 may transmit the preamble in RO 305-*a* and transmit the payload in PO 310-*a*. The UE 115 may transmit, for example, one of the configured preamble sequences of RO 305-*a* for the preamble of the random access message and use one of the DMRS ports configured for PO 310-*a* for the payload of the random access message.

In some examples, the UE 115 may be configured with a maximum number of front-loaded DMRS symbols for PUSCH. For example, a higher layer parameter, such as parameter maxLength in the DMRS uplink configuration or parameter msgA-maxLength in a MsgA DMRS configuration, may configure the number of front-loaded DMRS symbols for PUSCH. If the parameter maxLength is not configured, a single-symbol DMRS may be schedule for the UE 115 by DCI or configured by a configured grant configuration. The UE may be configured with a number of additional DMRS for PUSCH by a higher layer parameter (e.g., dmrs-AdditionalPosition), which may be "pos0," "pos1," "pos2," or "pos3." If maxLength is configured, either single-symbol DMRS or double symbol DMRS may be scheduled for the UE 115 by DCI or configured by the configured grant configuration.

The UE 115 may be configured with a number of additional DMRS for PUSCH by a higher layer parameter (e.g., dmrs-AdditionalPosition), which may be "pos0" or "pos1". For MsgA PUSCH for Type-2, or two-step, random access procedures, the UE 115 may be configured with a number of additional DMRS for PUSCH by a higher layer parameter. For example, the higher layer parameter "msgA-DMRS-AdditionalPosition may be set to "pos0," "pos1," "pos2," or "pos3" for single-symbol DMRS or set to "pos0" or "pos1" for double symbol DMRS. The UE 115 may transmit a number of additional DMRS as based on the higher layer parameter. In some cases, these parameters and higher layer parameters may be transmitted by an RRC message or a SIB carrying system information.

In some cases, the UE 115 may use single-symbol DMRS or double symbol DMRS based on configurations received from the base station 105. For example, via higher layer signaling, the UE 115 may receive configuration signaling for MsgA. In some cases, based on a configuration of a higher layer parameter in this configuration signaling, the UE 115 may determine whether to transmit single-symbol DMRS or double symbol DMRS. In some cases, the UE 115 may determine whether to use single-symbol DMRS or double symbol DMRS based on a lack of a configuration of a parameter. For example, if a maxLength parameter is not configured, a PUSCH time domain configuration for MsgA may be based on single-symbol DMRS.

In some cases, the UE 115 may be configured with multiple mapping types. For example, the UE 115 may be configured with slot-based PUSCH mapping and minislot-based PUSCH mapping. In some cases, the use of slot-based or minislot-based PUSCH mapping may be based on the higher layer parameters indicated to the UE 115 via the configuration signaling.

Figure 4:
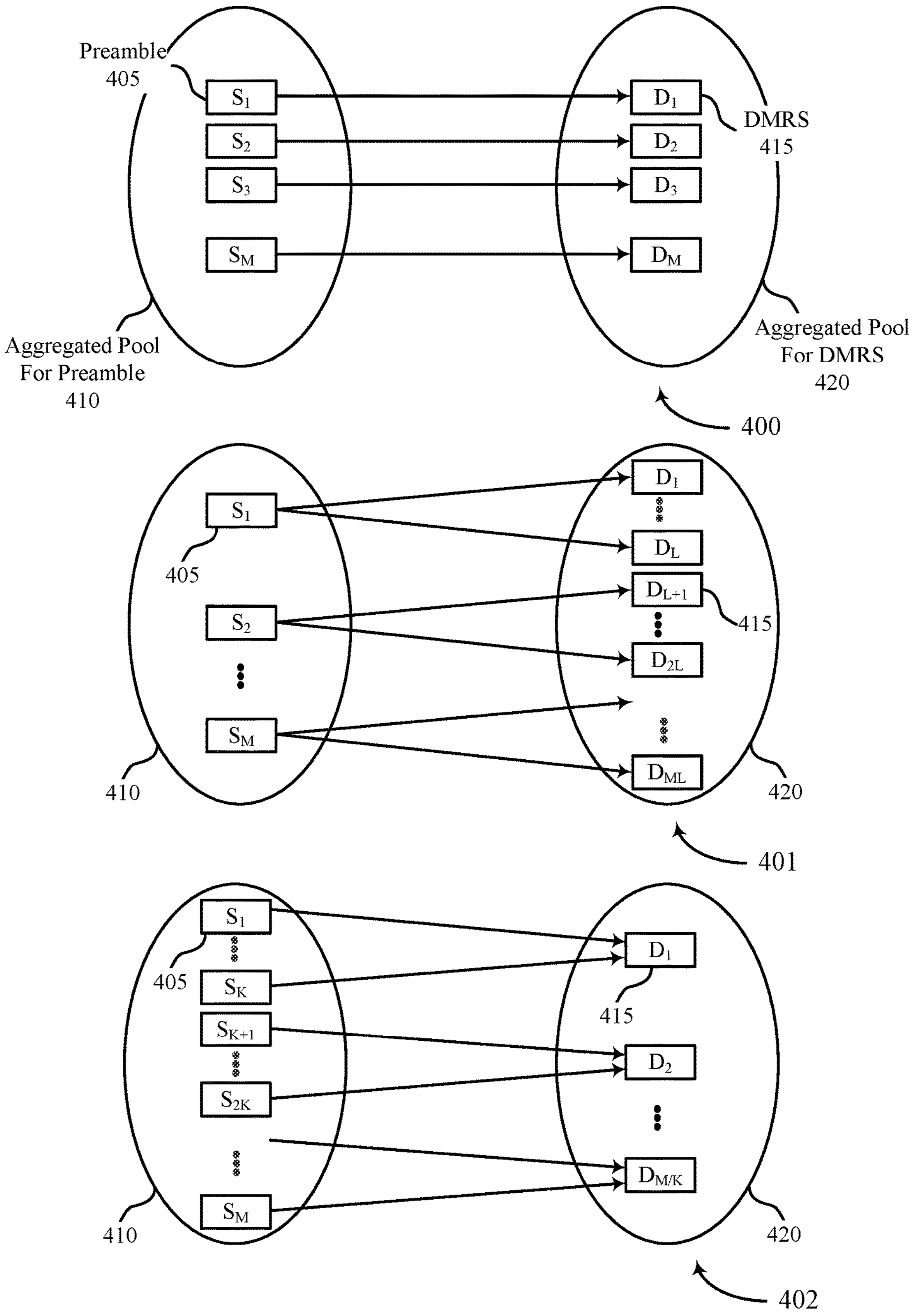
FIG. 4 illustrate examples of mapping rules that support preamble to demodulation reference signal mapping for random access procedures in accordance with aspects of the present disclosure.

FIG. 4 illustrates an example of mapping rules 400, 401, and 402 that support preamble to demodulation reference signal mapping for random access procedures in accordance with aspects of the present disclosure. In some examples, the mapping rules 400, 401, and 402 may implement aspects of wireless communications system 100.

A wireless communications system described herein may support a pool configuration for preamble sequences and DMRS. A base station may configure multiple POs and ROs within a transmission period of a random access message. Within the period of the random access message, the base station may aggregate preamble sequences and DMRSs from multiple ROs and POs to construct a larger pool size. By pooling the preamble sequences and DMRSs from multiple ROs and POs respectively, the wireless communications system may still configure multiple ROs and POs to reduce a probability of collision while increasing resource utilization. The base station 105 may apply an aggregation rule when determining an aggregated pool for preamble sequences (e.g., preamble pool 410) and an aggregated pool for DMRS (e.g., DMRS pool 420). The configuration of the ROs, including a configuration for the preamble pool 410, and POs, including a configuration for the DMRS pool 420, may be signaled to the UE 115 via SI or RRC signaling.

The preamble pool 410 may have M preamble sequences 405. For example, each of the different ROs aggregated in the preamble pool 410 may have a number of distinct preamble sequences, and M may be the sum of all preamble sequences of all ROs aggregated for the preamble pool 410. The DMRS pool 420 may have Q DMRS sequences 415. For example, each of the different POs aggregated in the DMRS pool 420 may have a number of distinct DMRS sequences, and Q may be the sum of all DMRS sequences of all POs aggregated for the DMRS pool 420. In some cases, the preamble sequences 405 in the preamble pool 410 may be ordered based on preamble sequence identifiers of the preamble sequences 405. In some examples, the DMRS sequences 415 in the DMRS pool 420 may be ordered based on DMRS sequence identifiers of the payload of the random access message.

A base station 105 and a UE 115 may implement techniques to support mapping between the preamble sequences 405 of the preamble pool 410 and the DMRS sequences 415 of the DMRS pool 420 and corresponding payloads. For example, the UE 115 may select a first preamble sequence 405 of the preamble pool 410 for the preamble of the random access message, then select a corresponding DMRS sequence 415 of the DMRS pool 420 for the payload of the random access message based on the mapping rule and configuration of the pools. Based on the mapping between the preamble sequence and the DMRS sequence, the UE 115 may transmit on a corresponding set of time/frequency resources to transmit a payload of the random access message (e.g., including one or more PUSCH symbols). Therefore, in some cases, the mapping may be between the preamble sequence and the DMRS sequence, or the preamble sequence and the payload, or between all three of the preamble sequence, the DMRS sequence, and the payload (e.g., the time/frequency resources used to transmit the payload). The base station 105 may decode the preamble sequence 405 and also determine the corresponding DMRS sequence 415 based on the selected preamble sequence 405 and mapping rule.

A mapping rule between a preamble sequence 405 and a DMRS sequence 415 may be configured for the preamble pool 410 and the DMRS pool 420. The mapping rules 400, 401, and 402 show a one-to-one mapping, a one-to-many mapping, and a many-to-one mapping for mapping preamble sequences 405 to DMRS sequences 415, respectively.

The mapping rules 400 may be an example of a direct mapping from one preamble sequence 405 to one DMRS sequence 415. In this example, the size of the preamble pool 410 and the size of the DMRS pool 420 may be the same. For example, M=Q, or there are M preamble sequences 405 in the preamble pool 410 and M DMRS sequences in the DMRS pool 420. In some cases, the preamble sequences 405 and the DMRS sequences 415 may be ordered and mapped based on respective identifiers. For example, if a UE 115 selects a third preamble sequence 405, the UE 115 may select a third DMRS sequence 415. In other examples, other mappings (e.g., which may be based on other factors or configuration information) may be applied as long as they provide a one-to-one mapping for the preamble sequences 405 and the DMRS sequences 415.

The mapping rule 401 may be an example of a one-to-many mapping from one preamble sequence 405 to multiple DMRS sequences 415. In this example, there may be M preamble sequences 405 in the preamble pool 410 and ML DMRS sequences 415 in the DMRS pool 420 (e.g., where Q=ML). In this example, each preamble sequence 405 may map to L different DMRS sequences 415. In some examples, some preamble sequences 405 may map to different numbers of DMRS sequences 415. For example, a first preamble sequence 405 may map to R DMRS sequences 415, and a second preamble sequence 405 may map to S DMRS sequence 415, where R≠S. In some cases, a preamble sequence 405 of the one-to-many mapping rule 401 may carry or convey information for payload configurations for the random access messages of the DMRS pool 420. In some cases, the preamble sequences 405 may carry additional information regarding resource allocation and size and a waveform indication for the payload of the random access message.

The mapping rule 402 may be an example of a many-to-one mapping from multiple preamble sequences 405 to one DMRS sequence 415. In this example, there may be M preamble sequences 405 in the preamble pool 410 and M/K DMRS sequences 415 in the DMRS pool 420 (e.g., where Q=M/K). Similar to the one-to-many mapping rule 401, in some cases, a different number of preamble sequences 405 may map to a single DMRS sequence 415. For example, a first number of preamble sequences 405 may map to a first DMRS sequence 415, and a second, different number of preamble sequences 405 may map to a second DMRS sequence 415. In some cases, the preamble sequences 405 in the many-to-one mapping rule 402 may carry additional information for PUSCH transmission parameters. For example, the preambles sequences 405 may convey or carry beam configuration information.

Within a single period for the random access message, one or more mapping rules may be applied. For example, a single period for the random access message may apply one or more of the mapping rules 400, 401, and 402. For example, a first preamble sequence 405 of the preamble pool 410 may use the one-to-one mapping rule 400 for a random access message, and a second preamble sequence 405 of the preamble pool 410 may use the one-to-many mapping rule 401 for the random access message. In some cases, the mapping rules may be configured by the network, and the base station 105 may receive an indication of which mapping rules to apply for the pools from a network device. In some cases, the applied mapping rule may be based on a deployment of the UE 115. For example, a same or different mapping rule may be configured for dual connectivity, carrier aggregation, or supplemental uplink.

In some cases, an RO may be configured for both two-step random access procedures and four-step random access procedures. In some wireless communications systems, such as wireless communications system 200 described with reference to FIG. 2, two-step random access procedures and four-step random access procedures may both be supported. In some cases, some preamble sequences 405 may be shared by UEs 115 performing two-step random access procedures and UEs 115 performing four-step random access procedures.

In some cases, based on the size of the preamble pool 410 and traffic load, a preamble sequence 405 can be transmitted on separate and shared ROs. In some cases, based on the pool size, traffic load, and RO sharing status, a mapping rule may be adapted. In some cases, a wireless communications system may support up to a first number of shared ROs and support a second number of separate ROs. For example, there may be up to 32 shared ROs and there may be 64 separate ROs. In some cases, to reduce a collision probability for concurrent random access message transmission for multiple UEs 115, the ROs and POs may be configured such that M≥Q≥64, such that there are at least 64 DMRS ports, and the number of preamble sequences (e.g., M) is greater than or equal to the number of DMRS ports (e.g., Q).

For a separate RO of two-step RACH, the RO to PO mapping rule may be, for example, the one-to-many mapping rule 401. For example, the base station 105 may map the random access preamble sequence 405 for the two-step random access procedure to multiple sets of DMRS and PUSCH resources configured for payload transmission of the random access message. For a shared RO of two-step RACH, the RO to PO mapping rule may be, for example, the one-to-one mapping rule 400 or the one-to-many rule 401. For example, the base station 105 may map the preamble sequence 405 for both the two-step and four-step random access procedures to a corresponding DMRS sequence and set of PUSCH resources configured for the payload of the random access message. Or, the base station 105 may map multiple preamble sequences 405 configured for both the two-step and four-step random access message to a single DMRS sequence and corresponding set of PUSCH resources configured for payload transmission of the random access message. In some cases, information for the mapping rule adaptation may be carried in system information, RRC messages, or group paging.

As described a UE 115 may map preambles from valid PRACH occasions in a slot to valid PUSCH occasions. In some cases, the UE 115 may map a consecutive number of preambles, for example $N_{preamble}$ preambles, first in an increasing order of frequency resource indexes, $f_{id}$, for frequency multiplexed PRACH occasions. The UE 115 may second map in increasing order of frequency resource indexes for frequency multiplexed PRACH occasions. The UE 115 may then map, third, in increasing order of time resource indexes for time multiplexed PRACH occasions within a PRACH slot. The PUSCH occasions may be mapped, first, in increasing order of frequency resources $f_{id}$ for frequency multiplexed PUSCH occasions. The PUSCH occasions may secondly be mapped in increasing order of DMRS indexes within a PUSCH occasion, where a DMSR index, $DMRS_{id}$, is determined first in an ascending order of a DMRS port index and second in an ascending order of a DMRS sequence index. The UE may third map the PUSCH occasions in increasing order of time resource indexes $t_{id}$ for time multiplexed PUSCH occasions within a PUSCH slot. The UE may fourth map the PUSCH occasions in increasing order of indexes for PUSCH slots. In some cases, $N_{preamble}$ may be based on a total number of preambles in valid PRACH occasions per synchronization block (SSB) to physical random access channel (PRACH) occasion association pattern period, $T_{preamble}$, and a total number of valid sets of PUSCH occasions per SSB to RO association pattern period multiplied by the number of DMRS indexes per valid PUSCH occasions, $T_{PUSCH}$. For example, $$N_{preamble} = ceil\left(\frac{T_{preamble}}{T_{PUSCH}}\right).$$

Figure 5:
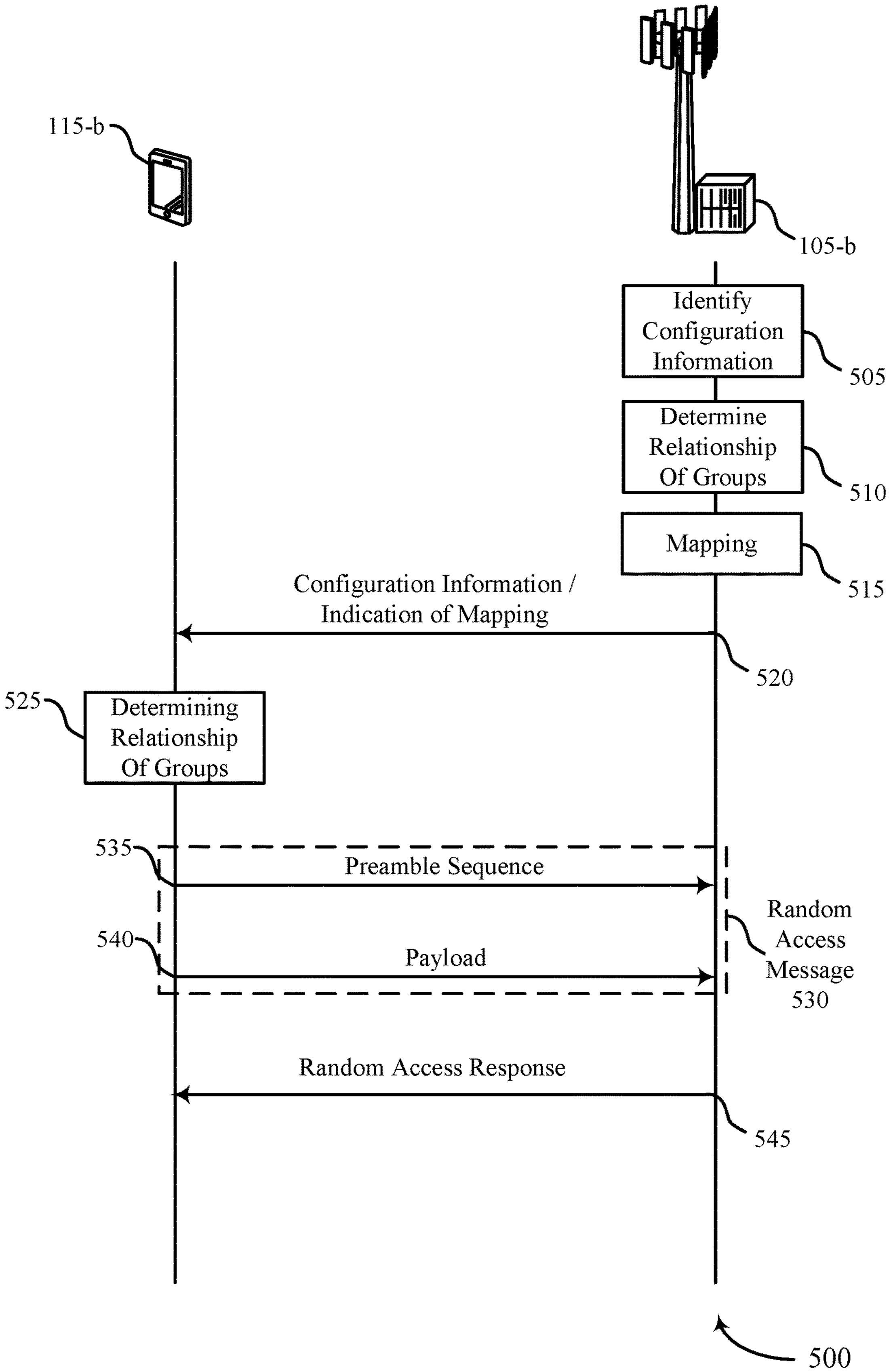
FIG. 5 illustrates an example of a process flow that supports preamble to demodulation reference signal mapping for random access procedures in accordance with aspects of the present disclosure.

FIG. 5 illustrates an example of a process flow 500 that supports preamble to demodulation reference signal mapping for random access procedures in accordance with aspects of the present disclosure. In some examples, process flow 500 may implement aspects of wireless communications system 100. The process flow 500 may include UE 115-*b* and base station 105-*b*, which may be respective examples of a UE 115 and a base station 105 as described herein.

At 505, base station 105-*b* may identify configuration information for a random access message of a random access procedure, the configuration information being associated with an aggregated set of preamble sequences related to one or more preamble occasions and an aggregated set of DMRS sequences and payloads for the random access message related to one or more PUSCH occasions. In some cases, the configuration information may be determined by base station 105-*b*, or at least some of the configuration information may be received from the network via a network device. The configuration information may be based on a cell deployment, a duplexing mode, or a potential RRC state of UE 115-*a*, or any combination thereof.

At 510, base station 105-*b* may determine, based on the configuration information, a mapping rule between a first group of preamble sequences including at least a part of the aggregated set of preamble sequences and a second group of resources for payloads of the random access message including at least a part of the aggregated set of DMRS sequences and payloads, where the first group and the second group are associated with a period of the random access message. The preamble pool 410 described with reference to FIG. 4 may be an example of the first group of preamble sequences. Similarly, the DMRS pool 420 described with reference to FIG. 4 may be an example of the second group resources for DMRS sequences and payloads of the random access message related to one or more POs. In some cases, the mapping rule between the first group of preamble sequences and the second group of resources for payloads of the random access message includes an aggregation rule. The aggregation rule may include, for example, a number of ROs and POs to include in the groups, sizes of the groups or resources, a relative size of the first group to the second group, etc.

At 515, base station 105-*b* may map, based on determining the mapping rule, at least some of the aggregated set of preamble sequences in the first group and at least some of the aggregated set of DMRS sequences and payloads of the random access message in the second group. In some cases, mapping the aggregated set of preamble sequences and the aggregated set of payloads of the random access message includes selecting a first preamble sequence from the aggregated set of preamble sequences and a second payload of the random access message from the aggregated set of payloads of the random access message.

In some examples, the mapping may include mapping each preamble sequence in the first group to a resource for transmitting a respective payload of the random access message in the second group. For example, each preamble sequence may be mapped to a DMRS sequence and respective time/frequency resource allocation for transmitting a payload of the random access message. This may be an example of the one-to-one mapping rule described with reference to FIG. 4. In some cases, the mapping may include mapping each preamble sequence in the first group to respective resources for transmitting payloads of the random access message in the second group. This may be an example of the one-to-many mapping rule described with reference to FIG. 4. In some cases, the mapping may include mapping multiple preamble sequences in the first group to a resource for transmitting a single payload of the random access message in the second group. This may be an example of a many-to-one mapping rule described with reference to FIG. 4.

At 520, base station 105-*b* may transmit, to UE 115-*b*, an indication of the mapping between the preamble sequences and the DMRS sequences and payloads of the random access message. In some cases, base station 105-*b* may transmit an indication of the configuration information for the random access message of the random access procedure to UE 115-*b*. In some cases, the indication of the mapping may be transmitted in a system information block or an RRC message.

At 525, UE 115-*b* may determine, based on the indication of the mapping, a mapping rule between the first group of preamble sequences including at least a part of the aggregated set of preamble sequences and a second group of DMRS sequences and payloads of the random access message including at least a part of the aggregated set of DMRS sequences and payloads of the random access message associated with a period of the random access message. In some cases, UE 115-*b* may access stored mapping configuration information in memory based on the indication of the mapping, where the determining is based on accessing the stored mapping configuration information. In some examples, UE 115-*b* may identify configuration information for the random access message, the configuration information associated with the aggregated set of preamble sequences and the aggregated set of payloads of the random access message, where determining the mapping rule between the first group and the second group is based at least in part on identifying the configuration information.

UE 115-*b* may then transmit a random access message 530 to base station 105-*b*. At 535, UE 115-*b* may transmit, based on determining the mapping rule, at least one preamble sequence of the aggregated set of preamble sequences in a preamble occasion and at least one DMRS sequence and payload of the random access message of the aggregated set of DMRS sequences and payloads of the random access message in a PUSCH occasion. The at least one payload of the random access message may be transmitted at 540. At 545, base station 105-*b* may transmit a random access response to UE 115-*b* in response to the random access message 530.

Figure 6:
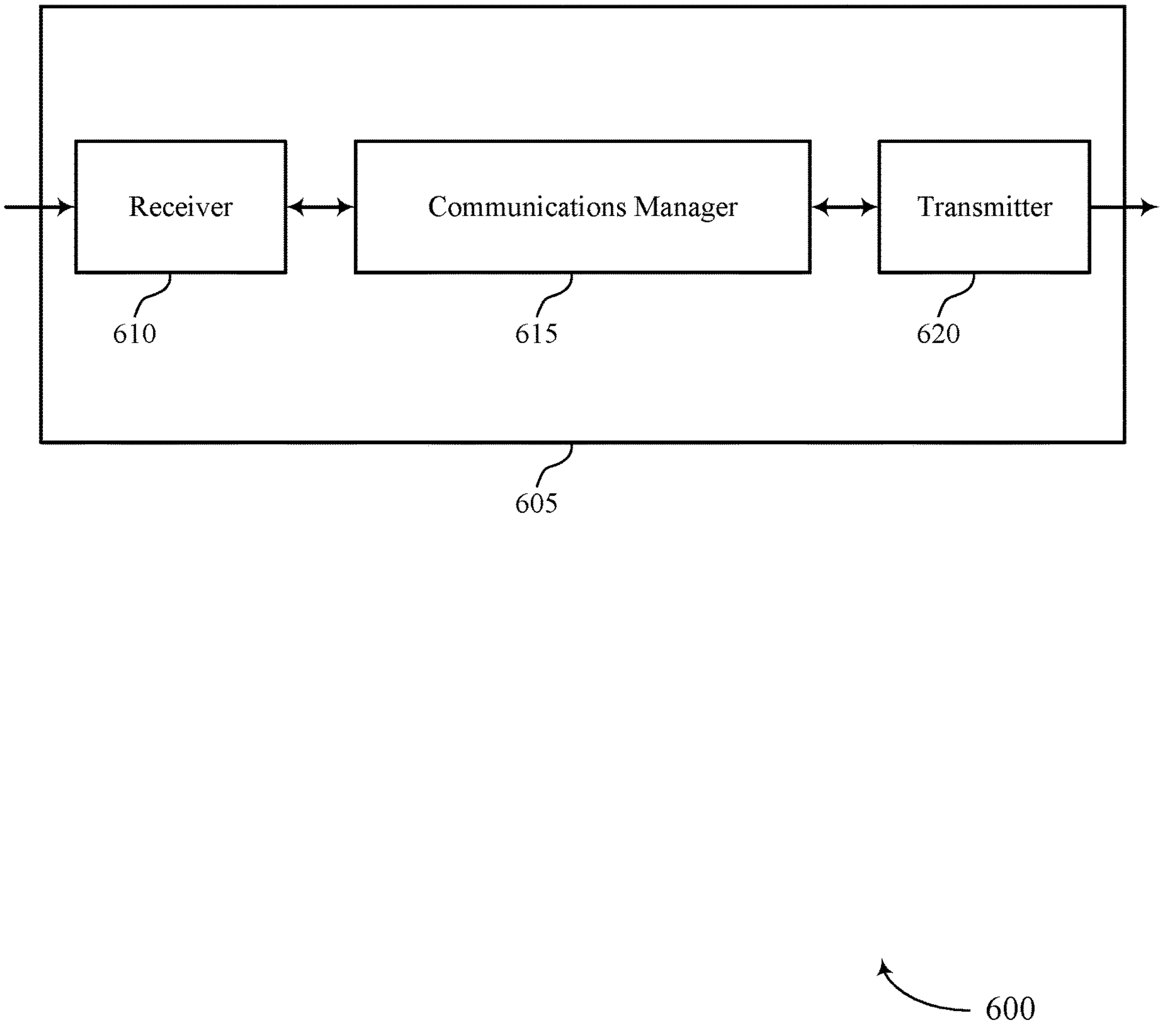
FIGS. 6 and 7 show block diagrams of devices that support preamble to demodulation reference signal mapping for random access procedures in accordance with aspects of the present disclosure.

FIG. 6 shows a block diagram 600 of a device 605 that supports preamble to demodulation reference signal mapping for random access procedures in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to preamble to DMRS mapping for random access procedures, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an indication of a mapping between an aggregated set of preamble sequences and an aggregated set of DMRS sequences and payloads of a random access message of a random access procedure. The communications manager 615 may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a resource mapping period of the random access message. The communications manager 615 may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
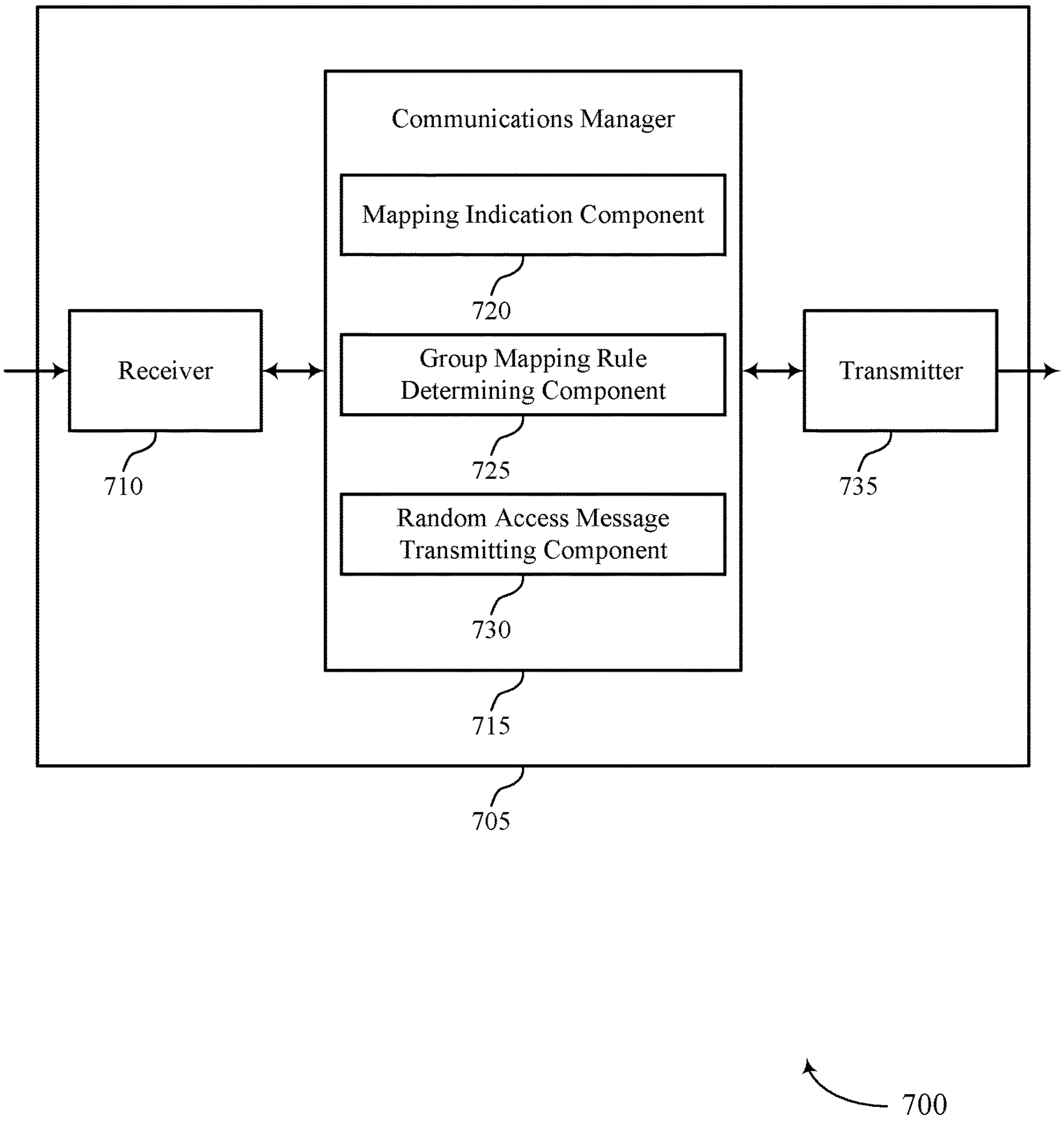

FIG. 7 shows a block diagram 700 of a device 705 that supports preamble to demodulation reference signal mapping for random access procedures in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to preamble to demodulation reference signal mapping for random access procedures, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a mapping indication component 720, a group mapping rule determining component 725, and a random access message transmitting component 730. The communications manager 715 may be an example of aspects of the communications manager 910 described herein.

The mapping indication component 720 may receive, from a base station, an indication of a mapping between an aggregated set of preamble sequences and an aggregated set of DMRS sequences and PUSCH resources of a random access message of a random access procedure.

The group mapping rule determining component 725 may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a resource mapping period of the random access message.

The random access message transmitting component 730 may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
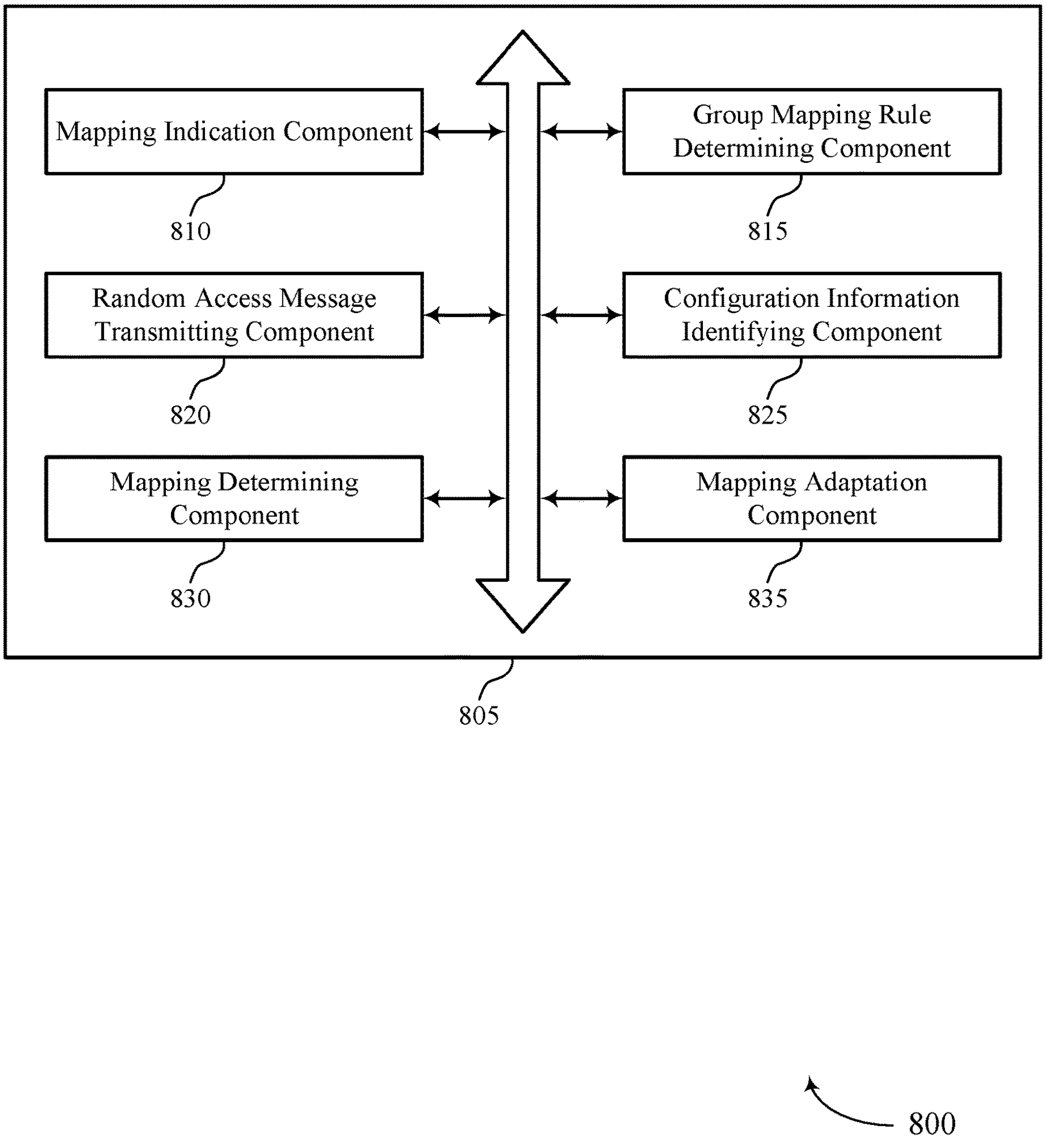
FIG. 8 shows a block diagram of a communications manager that supports preamble to demodulation reference signal mapping for random access procedures in accordance with aspects of the present disclosure.

FIG. 8 shows a block diagram 800 of a communications manager 805 that supports preamble to demodulation reference signal mapping for random access procedures in accordance with aspects of the present disclosure. The communications manager 805 may be an example of aspects of a communications manager 615, a communications manager 715, or a communications manager 910 described herein. The communications manager 805 may include a mapping indication component 810, a group mapping rule determining component 815, a random access message transmitting component 820, a configuration information identifying component 825, a mapping determining component 830, and a mapping adaptation component 835. Each of these modules may communicate, directly or indirectly, with one another (e.g., via one or more buses).

The mapping indication component 810 may receive, from a base station, an indication of a mapping between an aggregated set of preamble sequences and an aggregated set of DMRS sequences and payloads of a random access message of a random access procedure.

In some examples, the mapping indication component 810 may access stored mapping configuration information in memory of the UE based on the indication of the mapping, where the determining is based on accessing the stored mapping configuration information.

In some cases, the indication of the mapping is received in a system information block or a radio resource control message.

The group mapping rule determining component 815 may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, wherein the first group and the second group are associated with a resource mapping period of the random access message.

In some examples, the group mapping rule determining component 815 may order the first group based on corresponding preamble sequence identifiers for the preamble sequences and the second group based at least in part corresponding DMRS sequence identifiers and random access payload identifiers for the payloads of the random access message.

The random access message transmitting component 820 may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

In some cases, at least some of the DMRS sequences and payloads of the random access message in the second group include a DMRS sequence and a physical uplink shared channel symbol.

The configuration information identifying component 825 may identify configuration information for the random access message, the configuration information associated with the aggregated set of preamble sequences and the aggregated set of DMRS sequences and PUSCH resources of the random access message, where determining the mapping rule between the first group and the second group is based on identifying the configuration information.

In some examples, the configuration information identifying component 825 may receive the configuration information for the random access message from the base station, the configuration information being based on a cell deployment, a duplexing mode, or a potential radio resource control state of the UE, or any combination thereof.

In some cases, the period of the random access message is based on the configuration information.

The mapping determining component 830 may determine a mapping of each preamble sequence in the first group to resources for a respective DMRS sequence and PUSCH occasions for the payload of the random access message in the second group, where the transmitting includes transmitting a preamble sequence in the first group and a DMRS sequence and a PUSCH occasion for the payload in the second group based on determining the mapping.

In some examples, determining a mapping of each preamble sequence in the first group to resources for transmitting pluralities of DMRS sequences and PUSCH occasions for payloads of the random access message in the second group, where the transmitting includes transmitting a preamble sequence in the first group and one of the respective pluralities of DMRS sequences and PUSCH occasions for the payloads of the random access message in the second group based on determining the mapping.

In some examples, the mapping determining component 830 may transmit, with the preamble sequence in the first group, an indication of a waveform, a resource allocation, or both, associated with the set of DMRS sequences and PUSCH occasions for payloads of the random access message in the second group.

In some examples, determining a mapping of each respective set of preamble sequences in the first group to a respective DMRS sequence and PUSCH occasion for a payload of the random access message in the second group, where the transmitting includes transmitting one of the pluralities of preamble sequences in the first group and the respective DMRS sequence and PUSCH occasion for the payload of the random access message in the second group based on determining the mapping.

In some examples, the mapping determining component 830 may transmit, with the one of the pluralities of preamble sequences in the first group, an indication for a set of transmission parameters for the respective DMRS sequence and PUSCH occasion for the payload in the second group.

In some examples, the mapping determining component 830 may determine a first mapping rule for a first preamble sequence and a second mapping rule for a second preamble sequence within the period of the random access message, where the first mapping rule and the second mapping rule are different, and where transmitting the preamble sequence in the first group and the DMRS sequence and PUSCH occasion for the payload in the second group is based on determining the first mapping rule and the second mapping rule.

In some cases, the mapping is based on a dual connectivity, a carrier aggregation, or a supplemental uplink deployment of the UE.

The mapping adaptation component 835 may receive an indication of a mapping rule adaptation from the base station.

In some examples, the mapping adaptation component 835 may apply the mapping rule adaptation to the mapping, where at least one of the determining the mapping rule or transmitting the at least one preamble sequence and the at least one DMRS sequence and payload of the random access message is based on applying the mapping rule adaptation.

In some cases, the mapping rule adaptation is based on a first type of random access procedure for a first preamble sequence of the aggregated set of preamble sequences, a second type of random access procedure for a second preamble sequence of the aggregated set of preamble sequences, or both, where the first type and the second type are different.

Figure 9:
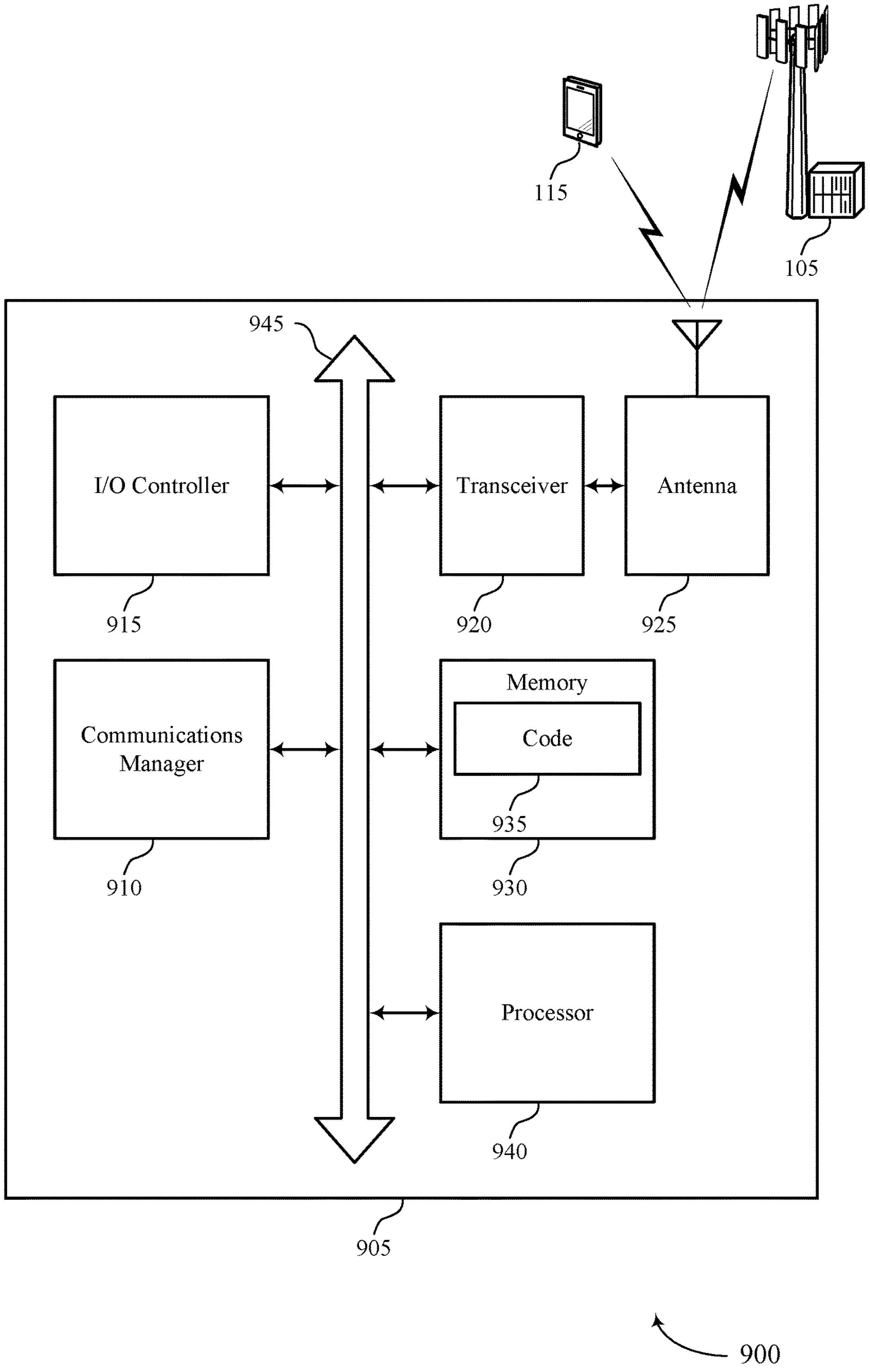
FIG. 9 shows a diagram of a system including a device that supports preamble to demodulation reference signal mapping for random access procedures in accordance with aspects of the present disclosure.

FIG. 9 shows a diagram of a system 900 including a device 905 that supports preamble to demodulation reference signal mapping for random access procedures in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an indication of a mapping between an aggregated set of preamble sequences and an aggregated set of DMRS sequences and payloads of a random access message of a random access procedure. The communications manager 910 may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, wherein the first group and the second group are associated with a resource mapping period of the random access message. The communications manager 910 may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting preamble to DMRS mapping for random access procedures).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
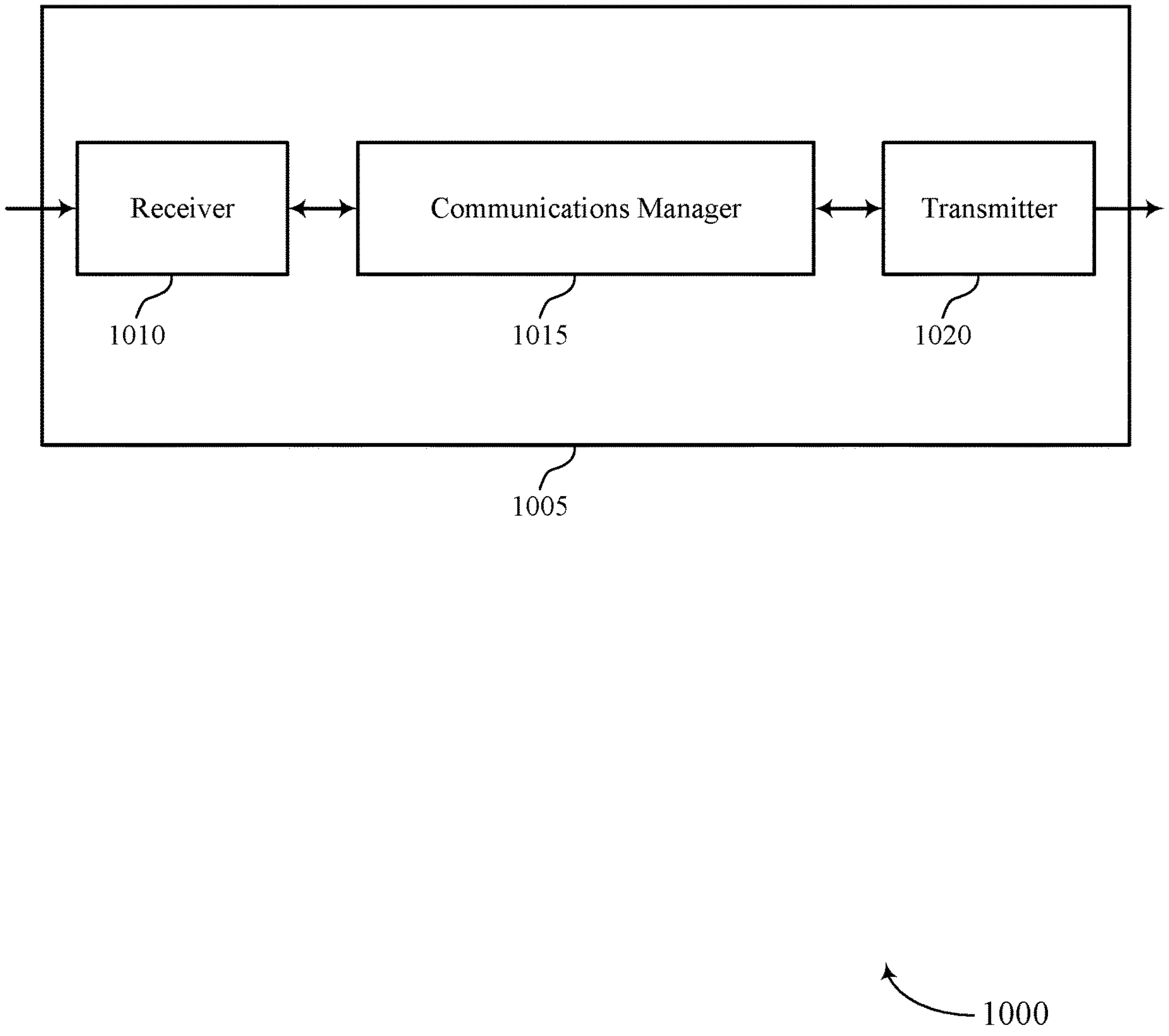
FIGS. 10 and 11 show block diagrams of devices that support preamble to demodulation reference signal mapping for random access procedures in accordance with aspects of the present disclosure.

FIG. 10 shows a block diagram 1000 of a device 1005 that supports preamble to demodulation reference signal mapping for random access procedures in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to preamble to DMRS mapping for random access procedures, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions. The communications manager 1015 may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message. The communications manager 1015 may map, based on determining the mapping rule, at least some of the aggregated set of preamble sequences in the first group and at least some of the aggregated set of DMRS sequences and payloads of the random access message in the second group. The communications manager 1015 may transmit, to a UE, an indication of the mapping rule between the preamble sequences and the DMRS sequences and PUSCH occasions for the payloads of the random access message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
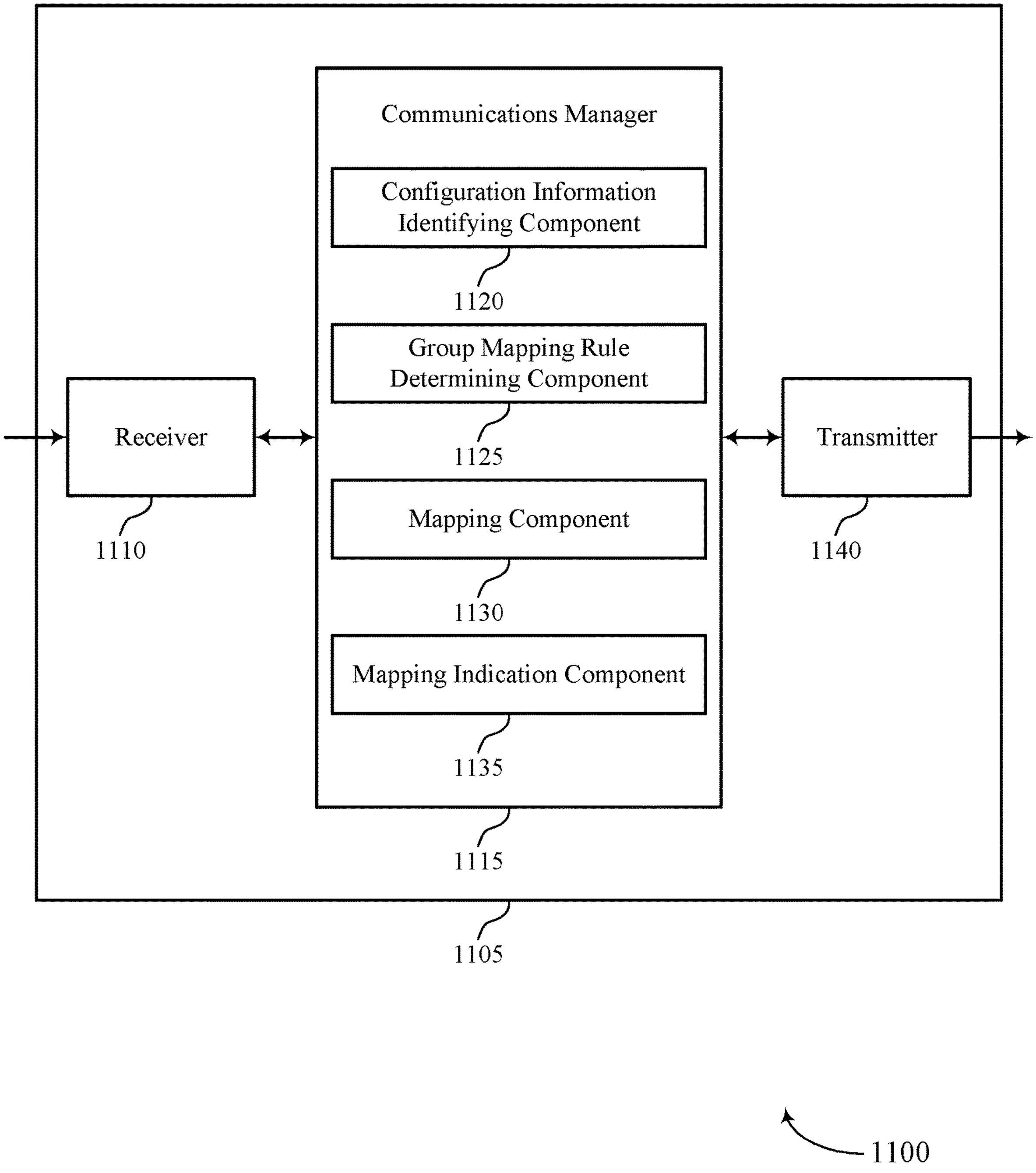

FIG. 11 shows a block diagram 1100 of a device 1105 that supports preamble to demodulation reference signal mapping for random access procedures in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to preamble to DMRS mapping for random access procedures, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration information identifying component 1120, a group mapping rule determining component 1125, a mapping component 1130, and a mapping indication component 1135. The communications manager 1115 may be an example of aspects of the communications manager 1310 described herein.

The configuration information identifying component 1120 may identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions.

The group mapping rule determining component 1125 may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same period of the random access message.

The mapping component 1130 may map, based on determining the mapping rule, at least some of the aggregated set of preamble sequences in the first group and at least some of the aggregated set of DMRS sequences and PUSCH occasions for the payloads of the random access message in the second group.

The mapping indication component 1135 may transmit, to a UE, an indication of the mapping rule between the preamble sequences and the DMRS sequences and PUSCH occasions for the payloads of the random access message.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
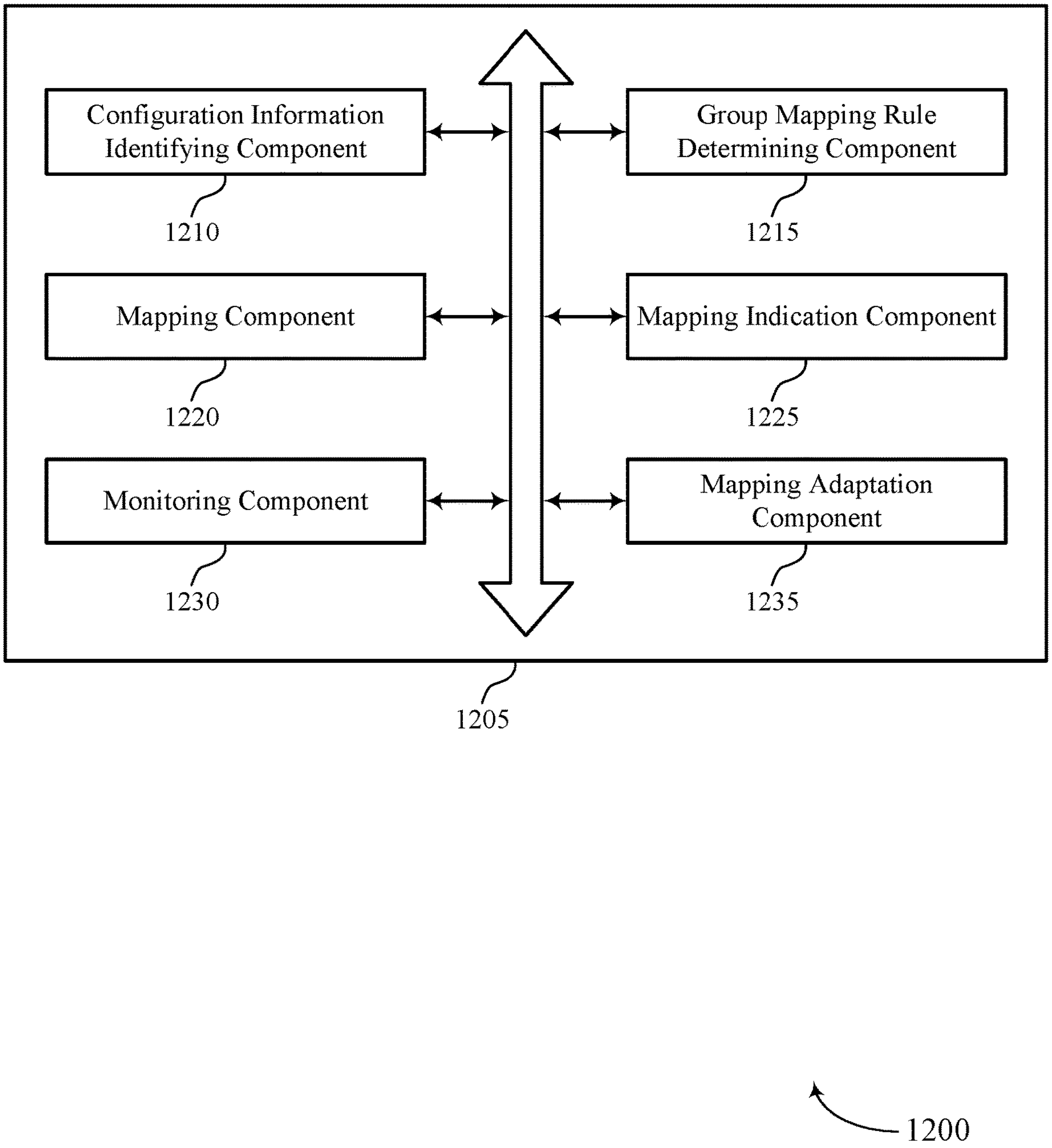
FIG. 12 shows a block diagram of a communications manager that supports preamble to demodulation reference signal mapping for random access procedures in accordance with aspects of the present disclosure.

FIG. 12 shows a block diagram 1200 of a communications manager 1205 that supports preamble to demodulation reference signal mapping for random access procedures in accordance with aspects of the present disclosure. The communications manager 1205 may be an example of aspects of a communications manager 1015, a communications manager 1115, or a communications manager 1310 described herein. The communications manager 1205 may include a configuration information identifying component 1210, a group mapping rule determining component 1215, a mapping component 1220, a mapping indication component 1225, a monitoring component 1230, and a mapping adaptation component 1235. Each of these modules may communicate, directly or indirectly, with one another (e.g., via one or more buses).

The configuration information identifying component 1210 may identify configuration information for a random access message of a random access procedure, the configuration information being associated with an aggregated set of preamble sequences related to one or more preamble occasions and an aggregated set of DMRS sequences and payloads of the random access message related to one or more PUSCH occasions.

In some examples, the configuration information identifying component 1210 may receive the configuration information for the random access message from a network device, the configuration information being based on a cell deployment, a duplexing mode, or a potential radio resource control state of the UE, or any combination thereof, where identifying the configuration information is based on receiving the configuration information.

In some examples, the configuration information identifying component 1210 may resource sizes of a preamble occasion for at least one preamble sequence and a PUSCH occasion for at least one DMRS sequence and at least one PUSCH occasion for the payload of the random access message are based on the configuration information.

In some examples, the configuration information identifying component 1210 may receive the configuration information from a network entity, where the mapping is based on receiving the configuration information from the network entity.

In some cases, the period of the random access message is based on the configuration information that is associated with a two-step random access procedure.

In some cases, at least some of the payloads of the random access message in the second group include a DMRS sequence and a PUSCH symbol.

The group mapping rule determining component 1215 may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message.

In some examples, the group mapping rule determining component 1215 may determine the first group of preamble sequences based on determining a number of preamble sequences for one or more preamble occasions of a total number of preamble occasions.

In some examples, the group mapping rule determining component 1215 may determine the second group of DMRS sequences and payloads of the random access message based on determining a number of random access payload configurations of the random access message for one or more PUSCH occasions of a total number of PUSCH occasions.

In some examples, the group mapping rule determining component 1215 may order the first group based on corresponding preamble sequence identifiers for the preambles and the second group based on the corresponding DMRS sequence identifier and random access payload identifiers.

In some cases, the first group of preamble sequences includes the entire aggregated set of preamble sequences and the second group of resources for payloads of the random access message includes the entire aggregated set of DMRS sequences and payloads (e.g., payloads of the random access message).

In some cases, the first group and the second group correspond to one or more preamble occasions and one or more PUSCH occasions.

In some cases, the mapping rule between the first group of preamble sequences and the second group of resources for DMRS sequences and payloads of the random access message includes an aggregation rule.

The mapping component 1220 may map, based on determining the mapping rule, at least some of the aggregated set of preamble sequences in the first group and at least some of the aggregated set of DMRS sequences and PUSCH occasions for the payloads of the random access message in the second group.

In some examples, the mapping component 1220 may select a first preamble sequence from the aggregated set of preamble sequences and a second DMRS sequence and payload of the random access message from the aggregated set of DMRS sequences and payloads of the random access message.

In some examples, the mapping component 1220 may map each preamble sequence in the first group to a resource for transmitting a respective DMRS sequence and payload of the random access message in the second group.

In some examples, the mapping component 1220 may map each preamble sequence in the first group to respective resources for transmitting DMRS sequences and payloads of the random access message in the second group.

In some examples, the mapping component 1220 may determine, based on one or more preamble sequences in the first group, a waveform, a resource allocation, or both, associated with a set of payloads of the random access message of the payloads of the random access message in the second group.

In some examples, the mapping component 1220 may map a set of preamble sequences in the first group to a resource for transmitting a single DMRS sequence and payload of the random access message in the second group.

In some examples, the mapping component 1220 may determine, based on the set of preamble sequences in the first group, a set of transmission parameters for the single DMRS sequence and payload of the random access message associated with the resource for transmitting the single DMRS sequence and payload of the random access message.

In some examples, the mapping component 1220 may apply a first mapping rule for a first preamble sequence and a second mapping rule for a second preamble sequence within the period of the random access message, the first mapping rule and the second mapping rule being different.

In some cases, the mapping is based on a dual connectivity, a carrier aggregation, or a supplemental uplink deployment of the UE.

The mapping indication component 1225 may transmit, to a UE, an indication of the mapping between the preamble sequences and the DMRS sequences and payloads of the random access message.

In some examples, the mapping indication component 1225 may transmit the indication of the mapping in a system information block or a radio resource control message.

In some examples, the mapping indication component 1225 may transmit an indication for a mapping rule adaptation to the UE.

In some examples, the mapping indication component 1225 may transmit, to the UE, the indication of the configuration information for the random access message of the random access procedure.

In some cases, the mapping, or the indication for the mapping rule adaptation, or both are based on a size of the first group, a size of the second group, a type of the random access procedure, a traffic load for the base station, or any combination thereof.

The monitoring component 1230 may monitor, based on the mapping rule and the mapping, one or more preamble occasions for at least one preamble sequence of the aggregated set of preamble sequences and one or more PUSCH occasions for at least one DMRS sequence and payload of the random access message of the aggregated set of DMRS sequences and payloads of the random access message.

In some examples, the monitoring component 1230 may transmit, to the UE, a random access response message based on monitoring the one or more preamble occasions and the one or more PUSCH occasions.

The mapping adaptation component 1235 may identify a first preamble sequence of the aggregated set of preamble sequences configured for a 2-step random access procedure, where the first preamble sequence is associated with a separate preamble occasion.

In some examples, the mapping adaptation component 1235 may identify a second preamble sequence of the aggregated set of preamble sequences configured for a 2-step random access procedure and a 4-step random access procedure, where the second preamble sequence is associated with a shared preamble occasion used by both a two-step random access UE and a four-step random access UE.

In some examples, the mapping adaptation component 1235 may map the first preamble sequence to a set of resources for transmitting DMRS sequences and PUSCH occasions for the payloads of the random access message.

In some examples, the mapping adaptation component 1235 may map the second preamble sequence to a corresponding set of resources for transmitting DMRS sequences and PUSCH occasions for the payloads of the random access message.

In some examples, the mapping adaptation component 1235 may identify a third preamble sequence of the aggregated set of preamble sequences configured for the 2-step random access procedure and the 4-step random access procedure.

In some examples, the mapping adaptation component 1235 may map the second preamble sequence and the third preamble sequence to a set of resources for transmitting DMRS sequences and payloads of the random access message.

Figure 13:
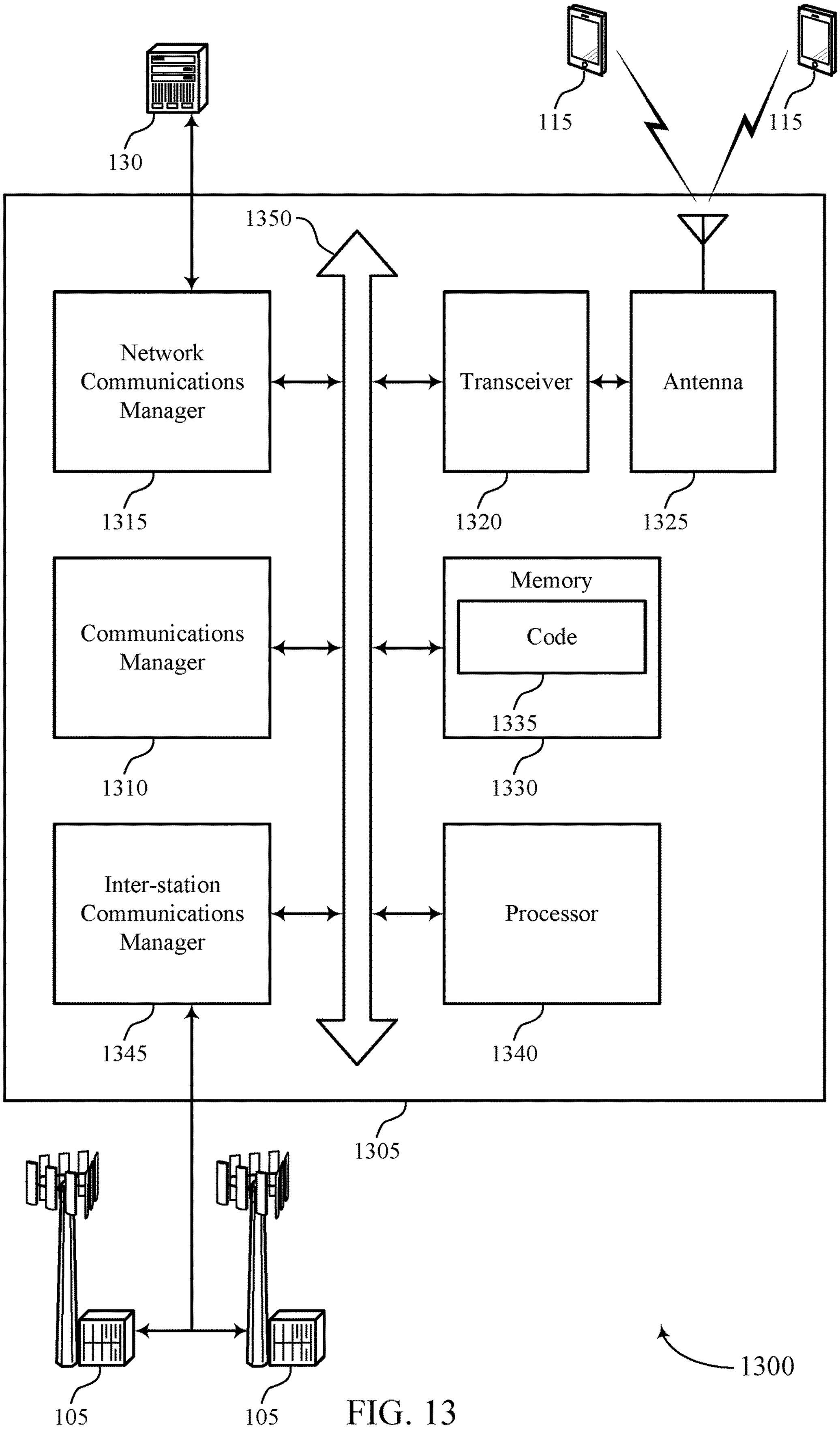
FIG. 13 shows a diagram of a system including a device that supports preamble to demodulation reference signal mapping for random access procedures in accordance with aspects of the present disclosure.

FIG. 13 shows a diagram of a system 1300 including a device 1305 that supports preamble to demodulation reference signal mapping for random access procedures in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify configuration information for a random access message of a random access procedure, the configuration information being associated with an aggregated set of preamble sequences related to one or more preamble occasions and an aggregated set of DMRS sequences and payloads of the random access message related to one or more PUSCH occasions. The communications manager 1310 may determine, based on the configuration information, a mapping rule between a first group of preamble sequences including at least a part of the aggregated set of preamble sequences and a second group of resources for payloads of the random access message including at least a part of the aggregated set of DMRS sequences and payloads, where the first group and the second group are associated with a same period of the random access message. The communications manager 1310 may map, based on determining the mapping rule, at least some of the aggregated set of preamble sequences in the first group and at least some of the aggregated set of DMRS sequences and payloads of the random access message in the second group. The communications manager 1310 may transmit, to a UE, an indication of the mapping between the preamble sequences and the DMRS sequences and payloads of the random access message.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting preamble to DMRS mapping for random access procedures).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
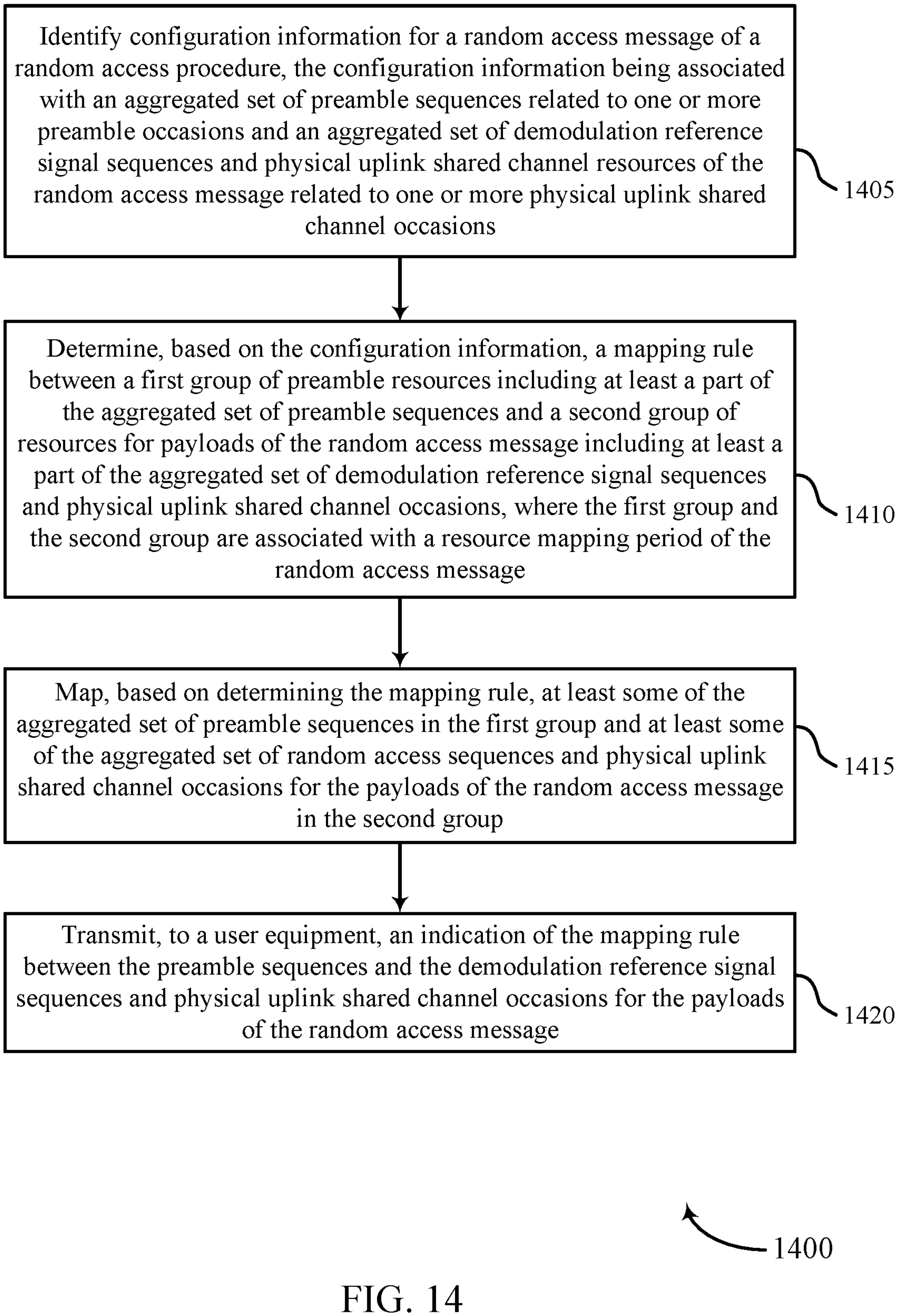
FIGS. 14 through 18 show flowcharts illustrating methods that support preamble to demodulation reference signal mapping for random access procedures in accordance with aspects of the present disclosure.

FIG. 14 shows a flowchart illustrating a method 1400 that supports preamble to demodulation DMRS mapping for random access procedures in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1405, the base station may identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions. The operations of 1405 may be performed according to the methods described herein. In some examples, aspects of the operations of 1405 may be performed by a configuration information identifying component as described with reference to FIGS. 10 through 13.

At 1410, the base station may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message. The operations of 1410 may be performed according to the methods described herein. In some examples, aspects of the operations of 1410 may be performed by a group mapping rule determining component as described with reference to FIGS. 10 through 13.

At 1415, the base station may map, based on determining the mapping rule, at least some of the aggregated set of preamble sequences in the first group and at least some of the aggregated set of DMRS sequences and PUSCH occasions for the payloads of the random access message in the second group. The operations of 1415 may be performed according to the methods described herein. In some examples, aspects of the operations of 1415 may be performed by a mapping component as described with reference to FIGS. 10 through 13.

At 1420, the base station may transmit, to a UE, an indication of the mapping rule between the preamble sequences and the DMRS sequences and PUSCH occasions for the payloads of the random access message. The operations of 1420 may be performed according to the methods described herein. In some examples, aspects of the operations of 1420 may be performed by a mapping indication component as described with reference to FIGS. 10 through 13.

Figure 15:
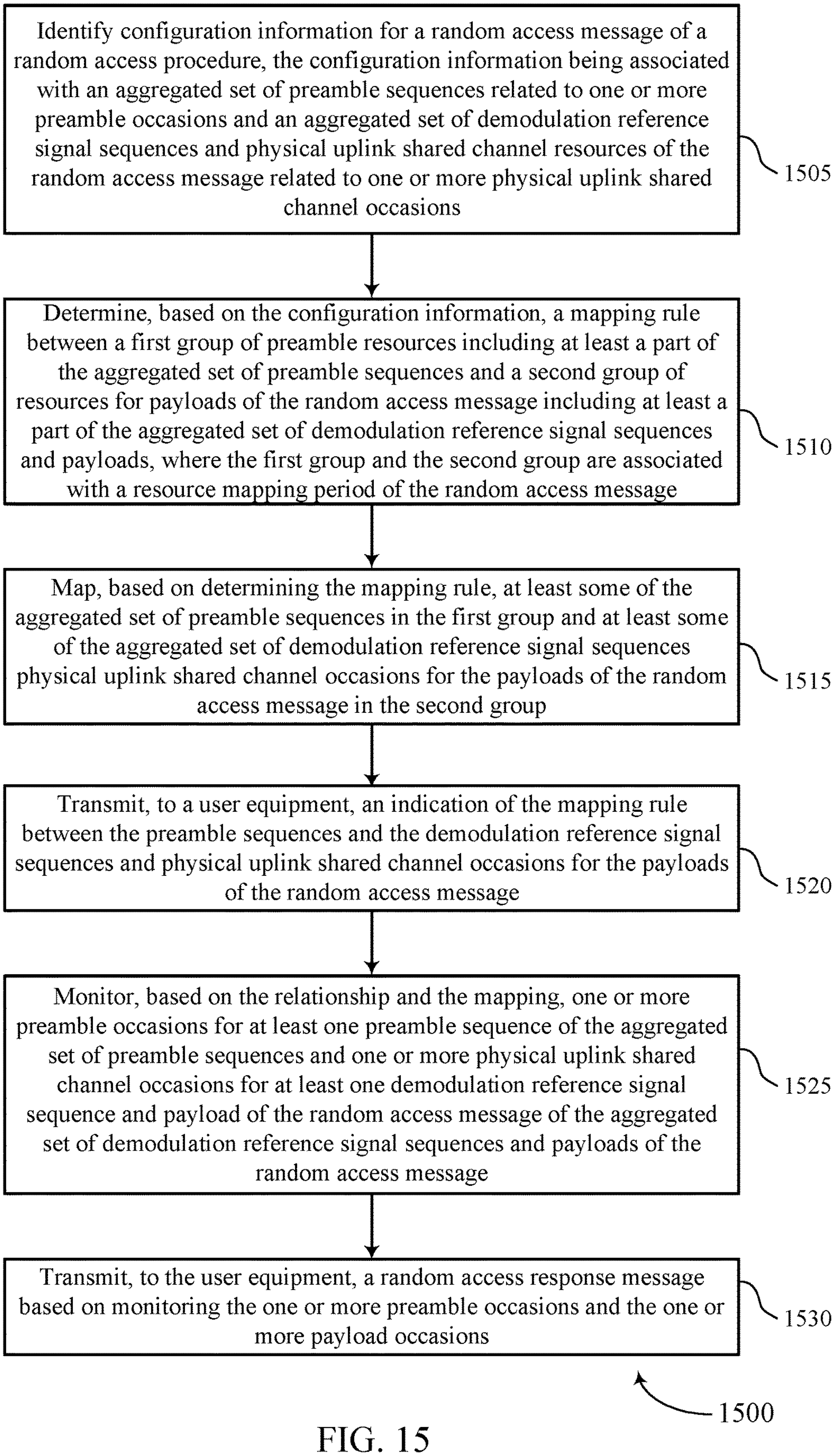

FIG. 15 shows a flowchart illustrating a method 1500 that supports preamble to demodulation reference signal mapping for random access procedures in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1505, the base station may identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions. The operations of 1505 may be performed according to the methods described herein. In some examples, aspects of the operations of 1505 may be performed by a configuration information identifying component as described with reference to FIGS. 10 through 13.

At 1510, the base station may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message. The operations of 1510 may be performed according to the methods described herein. In some examples, aspects of the operations of 1510 may be performed by a group mapping rule determining component as described with reference to FIGS. 10 through 13.

At 1515, the base station may map, based on determining the mapping rule, at least some of the aggregated set of preamble sequences in the first group and at least some of the aggregated set of DMRS sequences and payloads of the random access message in the second group. The operations of 1515 may be performed according to the methods described herein. In some examples, aspects of the operations of 1515 may be performed by a mapping component as described with reference to FIGS. 10 through 13.

At 1520, the base station may transmit, to a UE, an indication of the mapping between the preamble sequences and the DMRS sequences and PUSCH occasions for the payloads of the random access message. The operations of 1520 may be performed according to the methods described herein. In some examples, aspects of the operations of 1520 may be performed by a mapping indication component as described with reference to FIGS. 10 through 13.

At 1525, the base station may monitor, based on the mapping rule and the mapping, one or more preamble occasions for at least one preamble sequence of the aggregated set of preamble sequences and one or more PUSCH occasions for at least one DMRS sequence and payload of the random access message. The operations of 1525 may be performed according to the methods described herein. In some examples, aspects of the operations of 1525 may be performed by a monitoring component as described with reference to FIGS. 10 through 13.

At 1530, the base station may transmit, to the UE, a random access response message based on monitoring the one or more preamble occasions and the one or more PUSCH occasions. The operations of 1530 may be performed according to the methods described herein. In some examples, aspects of the operations of 1530 may be performed by a monitoring component as described with reference to FIGS. 10 through 13.

Figure 16:
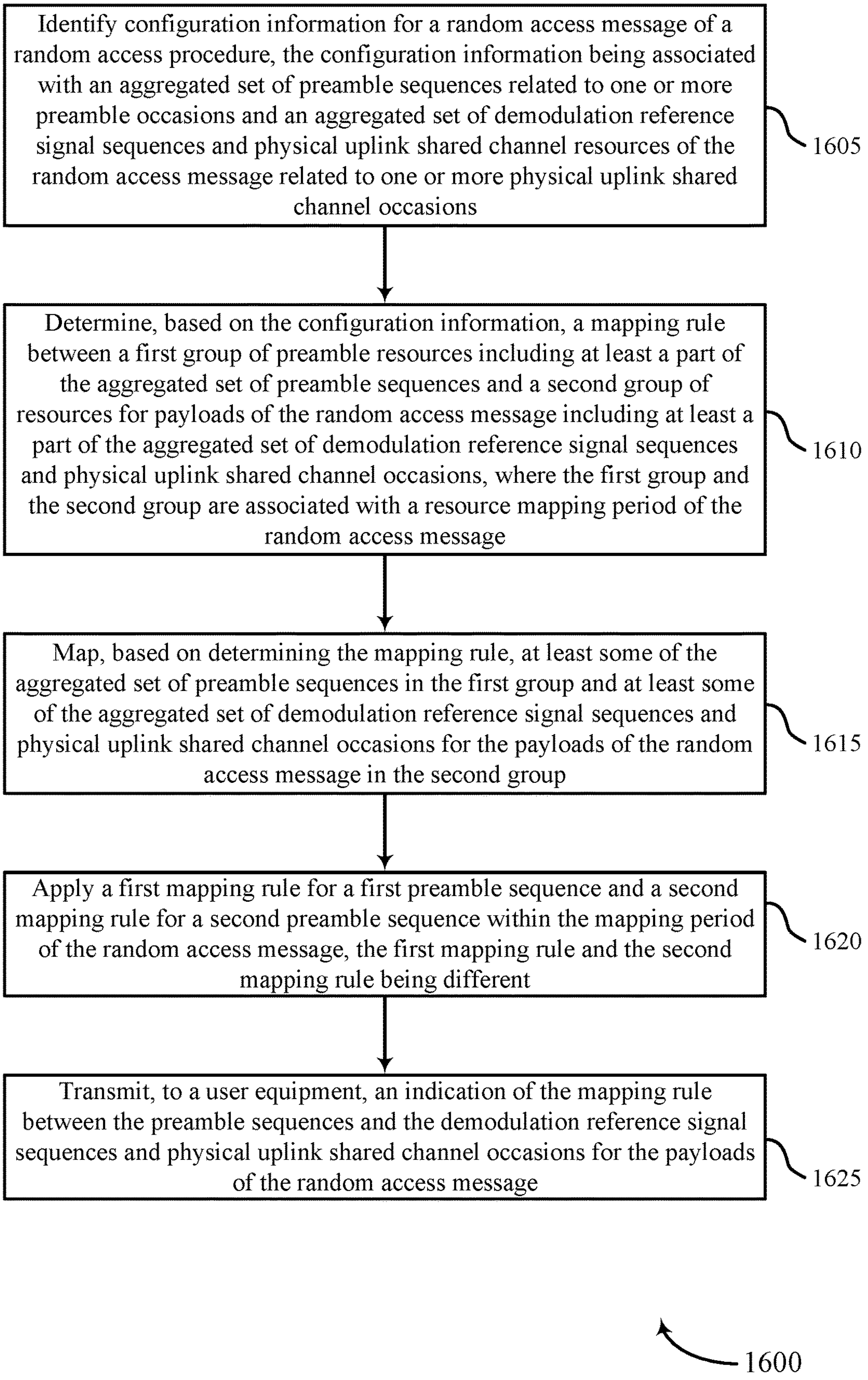

FIG. 16 shows a flowchart illustrating a method 1600 that supports preamble to demodulation reference signal mapping for random access procedures in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify configuration information for a random access message of a random access procedure, the configuration information being associated with an aggregated set of preamble sequences related to one or more preamble occasions and an aggregated set of DMRS sequences and PUSCH resources of the random access message related to one or more PUSCH occasions. The operations of 1605 may be performed according to the methods described herein. In some examples, aspects of the operations of 1605 may be performed by a configuration information identifying component as described with reference to FIGS. 10 through 13.

At 1610, the base station may determine, based on the configuration information, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a same resource mapping period of the random access message. The operations of 1610 may be performed according to the methods described herein. In some examples, aspects of the operations of 1610 may be performed by a group mapping rule determining component as described with reference to FIGS. 10 through 13.

At 1615, the base station may map, based on determining the mapping rule, at least some of the aggregated set of preamble sequences in the first group and at least some of the aggregated set of DMRS sequences and payloads of the random access message in the second group. The operations of 1615 may be performed according to the methods described herein. In some examples, aspects of the operations of 1615 may be performed by a mapping component as described with reference to FIGS. 10 through 13.

At 1620, the base station may apply a first mapping rule for a first preamble sequence and a second mapping rule for a second preamble sequence within the period of the random access message, the first mapping rule and the second mapping rule being different. The operations of 1620 may be performed according to the methods described herein. In some examples, aspects of the operations of 1620 may be performed by a mapping component as described with reference to FIGS. 10 through 13.

At 1625, the base station may transmit, to a UE, an indication of the mapping between the preamble sequences and the DMRS sequences and payloads of the random access message. The operations of 1625 may be performed according to the methods described herein. In some examples, aspects of the operations of 1625 may be performed by a mapping indication component as described with reference to FIGS. 10 through 13.

Figure 17:
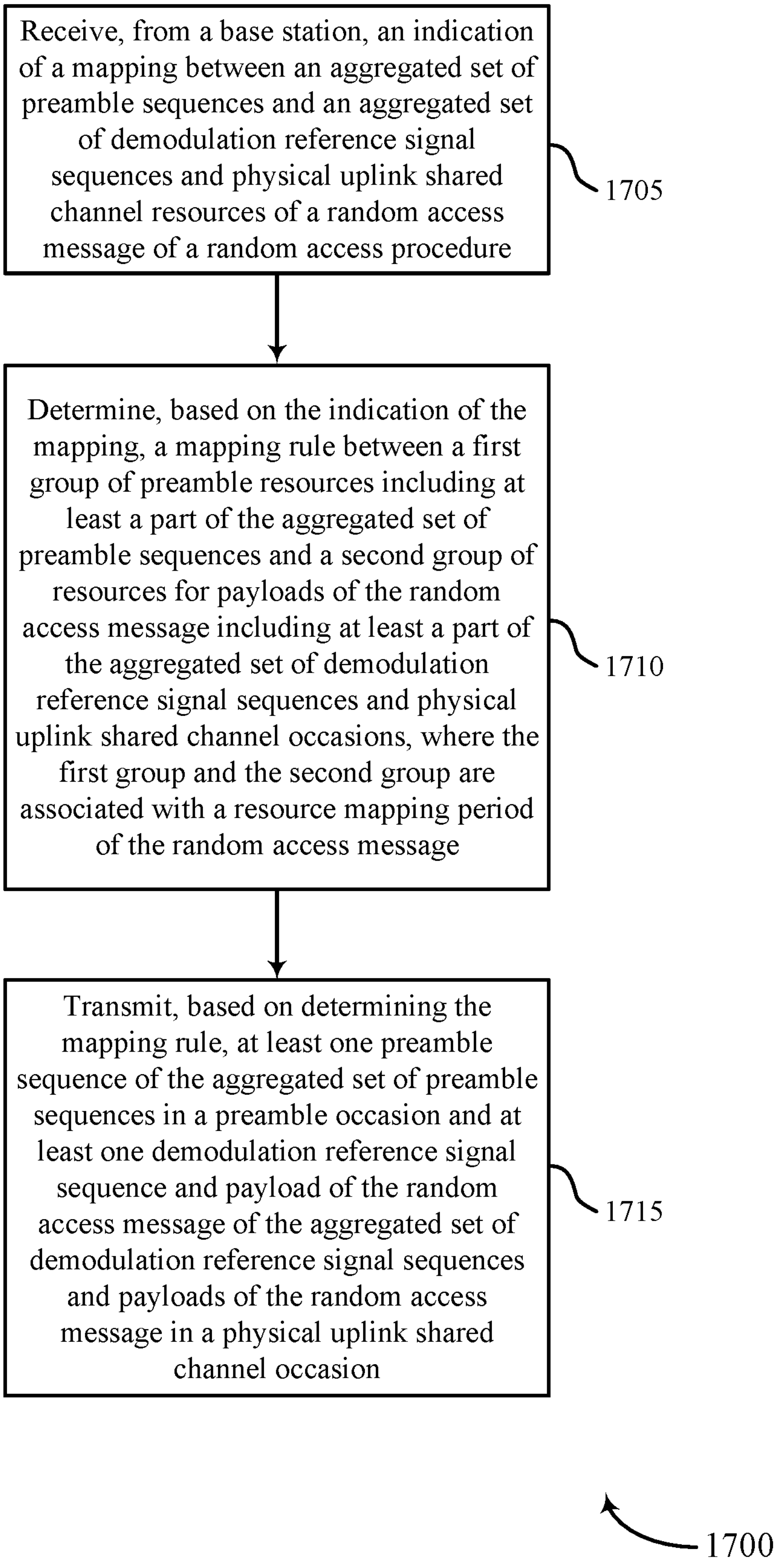

FIG. 17 shows a flowchart illustrating a method 1700 that supports preamble to demodulation reference signal mapping for random access procedures in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, an indication of a mapping between an aggregated set of preamble sequences and an aggregated set of DMRS sequences and PUSCH resources of a random access message of a random access procedure. The operations of 1705 may be performed according to the methods described herein. In some examples, aspects of the operations of 1705 may be performed by a mapping indication component as described with reference to FIGS. 6 through 9.

At 1710, the UE may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a resource mapping period of the random access message. The operations of 1710 may be performed according to the methods described herein. In some examples, aspects of the operations of 1710 may be performed by a group mapping rule determining component as described with reference to FIGS. 6 through 9.

At 1715, the UE may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion. The operations of 1715 may be performed according to the methods described herein. In some examples, aspects of the operations of 1715 may be performed by a random access message transmitting component as described with reference to FIGS. 6 through 9.

Figure 18:
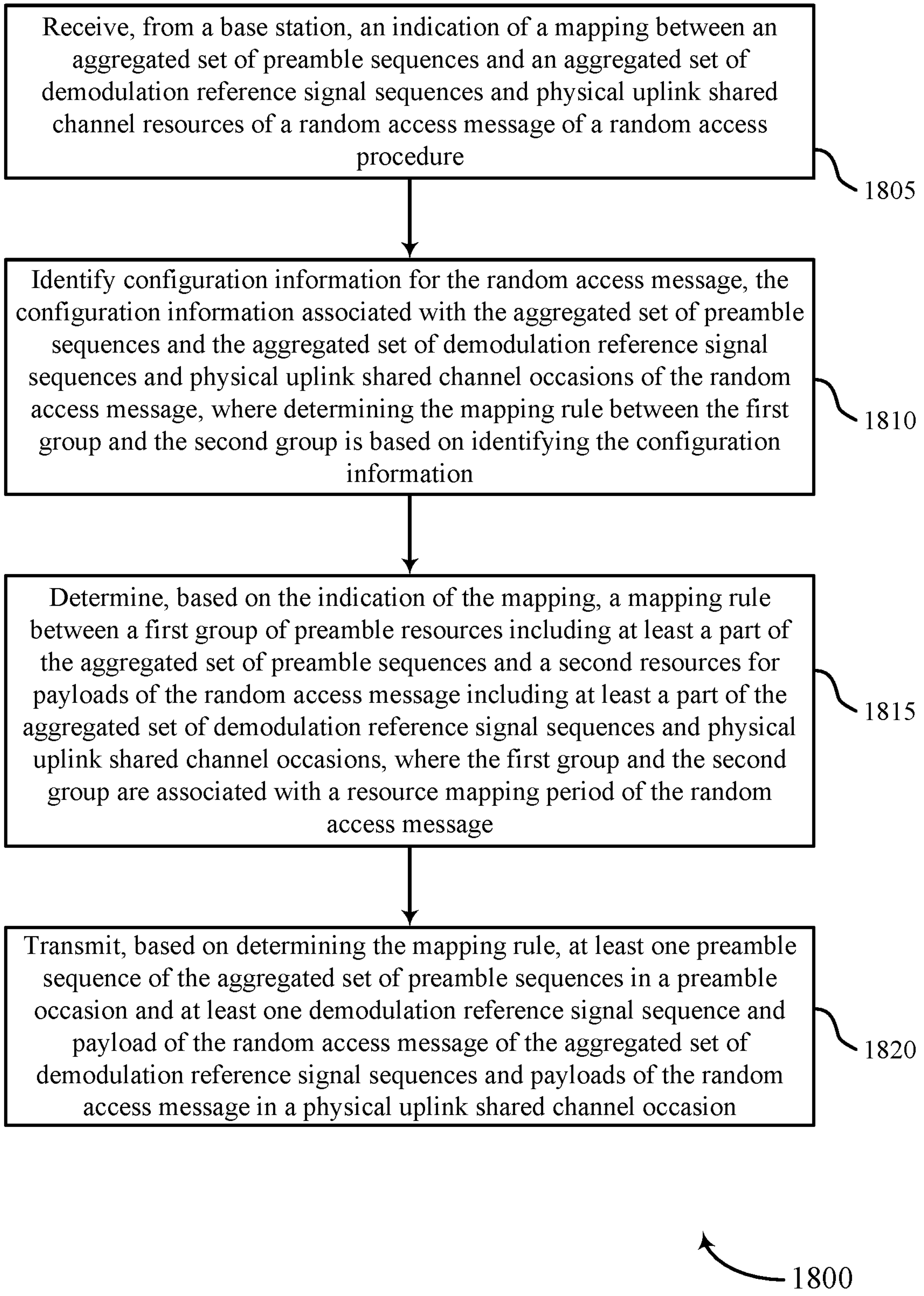

FIG. 18 shows a flowchart illustrating a method 1800 that supports preamble to demodulation reference signal mapping for random access procedures in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, an indication of a mapping between an aggregated set of preamble sequences and an aggregated set of DMRS sequences and PUSCH resources of a random access message of a random access procedure. The operations of 1805 may be performed according to the methods described herein. In some examples, aspects of the operations of 1805 may be performed by a mapping indication component as described with reference to FIGS. 6 through 9.

At 1810, the UE may identify configuration information for the random access message, the configuration information associated with the aggregated set of preamble sequences and the aggregated set of DMRS sequences and PUSCH resources of the random access message, where determining the mapping rule between the first group and the second group is based on identifying the configuration information. The operations of 1810 may be performed according to the methods described herein. In some examples, aspects of the operations of 1810 may be performed by a configuration information identifying component as described with reference to FIGS. 6 through 9.

At 1815, the UE may determine, based on the indication of the mapping, a mapping rule between a first group of preamble resources including at least a part of the aggregated set of preamble sequences and a second group of resources for payloads of the random access message including at least a part of the aggregated set of DMRS sequences and PUSCH occasions, where the first group and the second group are associated with a resource mapping period of the random access message. The operations of 1815 may be performed according to the methods described herein. In some examples, aspects of the operations of 1815 may be performed by a group mapping rule determining component as described with reference to FIGS. 6 through 9.

At 1820, the UE may transmit, based on determining the mapping rule, at least one preamble sequence of the aggregated set of preamble sequences in a preamble occasion and at least one DMRS sequence and at least one payload of the random access message of the aggregated set of DMRS sequences and payloads of the random access message in a PUSCH occasion. The operations of 1820 may be performed according to the methods described herein. In some examples, aspects of the operations of 1820 may be performed by a random access message transmitting component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:

transmitting an indication of configuration information for a random access message of a random access procedure, the configuration information being associated with an aggregated set of preamble sequences related to one or more preamble occasions and an aggregated set of demodulation reference signal (DMRS) sequences and physical uplink shared channel (PUSCH) occasions for the random access message related to one or more PUSCH occasions;

mapping, in accordance with the configuration information, the aggregated set of preamble sequences to the aggregated set of DMRS sequences and PUSCH occasions, wherein the mapping comprises:

ordering preamble sequences for a first group of preamble occasions associated with the aggregated set of preamble sequences in accordance with preamble sequence identifiers;

ordering DMRS sequences for a second group of PUSCH occasions associated with the aggregated set of DMRS sequences and PUSCH occasions in accordance with DMRS sequence identifiers; and mapping one or more preamble sequences of the first group of preamble occasions to one or more DMRS sequences of the second group of PUSCH occasions, wherein a quantity of PUSCH occasions of the second group of PUSCH occasions is based at least in part on a resource allocation information corresponding to the random access message for the one or more PUSCH occasions; and transmitting, to a user equipment, an indication of the mapping of the one or more preamble sequences of the first group of preamble occasions to the one or more DMRS sequences of the second group of PUSCH occasions.

2. The method of claim 1, wherein mapping the aggregated set of preamble sequences and the aggregated set of DMRS sequences and PUSCH occasions comprises:

selecting a preamble sequence from the aggregated set of preamble sequences and a DMRS sequence and a PUSCH occasion from the aggregated set of DMRS sequences and PUSCH occasions, wherein a payload portion of the random access message is mapped to the PUSCH occasion and the DMRS sequence is used for demodulating the payload portion of the random access message.

3. The method of claim 1, wherein the first group of preamble occasions is in accordance with a first quantity of preamble sequences for the one or more preamble occasions.

4. The method of claim 1, wherein mapping the aggregated set of preamble sequences and the aggregated set of DMRS sequences and PUSCH occasions comprises:

mapping each preamble sequence of the aggregated set of preamble sequences to a respective DMRS sequence and PUSCH occasion of the aggregated set of DMRS sequences and PUSCH occasions.

5. The method of claim 1, wherein mapping the aggregated set of preamble sequences and the aggregated set of DMRS sequences and PUSCH occasions comprises:

mapping each preamble sequence of the aggregated set of preamble sequences to multiple DMRS sequences and PUSCH occasions of the aggregated set of DMRS sequences and PUSCH occasions.

6. The method of claim 1, wherein mapping the aggregated set of preamble sequences and the aggregated set of DMRS sequences and PUSCH occasions comprises:

mapping a plurality of preamble sequences of the aggregated set of preamble sequences to a single DMRS sequence and PUSCH occasion of the aggregated set of DMRS sequences and PUSCH occasions.

7. The method of claim 1, further comprising:

applying a first mapping for a first preamble sequence of the aggregated set of preamble sequences and a second mapping for a second preamble sequence of the aggregated set of preamble sequences within a mapping period of the random access message, the first mapping and the second mapping being different.

8. The method of claim 1, wherein a mapping period of the random access message is associated with a two-step random access procedure and a synchronization block (SSB) to physical random access channel (PRACH) occasion association pattern period.

9. The method of claim 1, wherein the indication of the mapping is indicated via a system information block or a radio resource control message.

10. The method of claim 1, where transmitting the indication of the mapping to the user equipment comprises:

transmitting an indication for a mapping adaptation to the user equipment, wherein the mapping, or the indication for the mapping adaptation, or both are associated at least in part with a first size of the first group of preamble occasions, a second size of the second group of PUSCH occasions, a type of the random access procedure, a traffic load for the network device, or any combination thereof.

11. The method of claim 1, wherein:

resource sizes of a preamble occasion for at least one preamble sequence of the random access message and resource sizes for at least one DMRS sequence and at least one PUSCH occasion of the random access message are associated at least in part with the configuration information.

12. The method of claim 1, wherein a payload of the random access message corresponding to the second group of PUSCH occasions comprise a DMRS sequence and a PUSCH symbol.

13. The method of claim 1, wherein the indication of the mapping comprises the indication of the configuration information for the random access message of the random access procedure.

14. The method of claim 1, further comprising:

receiving the configuration information for the random access message from a second network device, the configuration information being in accordance with a cell deployment, a duplexing mode, or a potential radio resource control state of the user equipment, or any combination thereof, wherein transmitting the indication of the configuration information is in accordance with receiving the configuration information.

15. The method of claim 1, wherein the aggregated set of preamble sequences are associated with a respective random access preamble and the one or more preamble occasions comprise respective random access channel resources associated with a transmission of the respective random access preamble, and wherein both the respective random access preamble and the respective random access channel resources are associated with a two-step random access procedure and a four-step random access procedure.

16. The method of claim 1, wherein both at least one preamble occasion of the first group of preamble occasions and at least one preamble sequence of the aggregated set of preamble sequences are associated with a two-step random access procedure and a four-step random access procedure in accordance with the configuration information indicating the aggregated set of preamble sequences and the one or more preamble occasions are shared for at least one of the two-step random access procedure or for the four-step random access procedure.

17. A method for wireless communications at a user equipment, comprising:

receiving, from a network device, an indication of a mapping of an aggregated set of preamble sequences related to one or more preamble occasions to an aggregated set of demodulation reference signal (DMRS) sequences and physical uplink shared channel (PUSCH) occasions for of a random access message of a random access procedure;

ordering, in accordance with the indicated mapping, preamble sequences for a first group of preamble occasions associated with the aggregated set of preamble sequences in accordance with preamble sequence identifiers;

ordering, in accordance with the indicated mapping, DMRS sequences for a second group of PUSCH occasions associated with the aggregated set of DMRS sequences and PUSCH occasions in accordance with DMRS sequence identifiers;

mapping one or more preamble sequences of the first group of preamble occasions to one or more DMRS sequences of the second group of PUSCH occasions in accordance with the indicated mapping, wherein a quantity of PUSCH occasions of the second group of PUSCH occasions is based at least in part on a resource allocation information corresponding to the random access message for the one or more PUSCH occasions; and transmitting, in accordance with the mapping of the one or more preamble sequences of the first group of preamble occasions to the one or more DMRS sequences of the second group of PUSCH occasions, at least one preamble sequence of the aggregated set of preamble sequences in a preamble occasion of the first group of preamble occasions and at least one DMRS sequence of the aggregated set of DMRS sequences in a PUSCH occasion of the second group of PUSCH occasions.

18. The method of claim 17, wherein configuration information for the random access message is associated with the aggregated set of preamble sequences and the aggregated set of DMRS sequences and PUSCH occasions of the random access message, wherein the mapping of the one or more preamble sequences of the first group of preamble occasions to the one or more DMRS sequences of second group of PUSCH occasions is in accordance with the configuration information.

19. The method of claim 18, further comprising:

receiving the configuration information for the random access message from the network device, the configuration information being associated at least in part with a cell deployment, a duplexing mode, or a potential radio resource control state of the user equipment, or any combination thereof.

20. The method of claim 17, further comprising:

accessing stored mapping configuration information comprising the mapping in memory of the user equipment in accordance with the indication of the mapping.

21. The method of claim 17, wherein each preamble sequence associated with the first group of preamble occasions is mapped to a respective DMRS sequence and PUSCH occasion associated with the second group of PUSCH occasions.

22. The method of claim 17, wherein each preamble sequence associated with the first group of preamble occasions is mapped to a plurality of DMRS sequences and PUSCH occasions associated with the second group of PUSCH occasions.

23. The method of claim 17, wherein a plurality of preamble sequences associated with the first group of preamble occasions is mapped to a single DMRS sequence and PUSCH occasion associated with the second group of PUSCH occasions.

24. The method of claim 17, wherein a first mapping for a first preamble sequence and a second mapping for a second preamble sequence within a resource mapping period of the random access message, wherein the first mapping and the second mapping are different.

25. The method of claim 17, further comprising:

receiving an indication of a mapping adaptation from the network device; and applying the mapping adaptation to the mapping, wherein transmitting the at least one preamble sequence and the at least one DMRS sequence and PUSCH occasion for a payload of the random access message is in accordance with the mapping adaptation.

26. The method of claim 25, wherein the mapping adaptation is in accordance with a first type of random access procedure for a first preamble sequence of the aggregated set of preamble sequences, a second type of random access procedure for a second preamble sequence of the aggregated set of preamble sequences, or both, wherein the first type and the second type are different.

27. The method of claim 17, wherein a payload of the random access message comprises a DMRS sequence and a PUSCH symbol.

28. An apparatus for wireless communications at a network device, comprising:

a processor, memory in electronic communication with the processor; and instructions stored in the memory and executable by the processor to cause the apparatus to:

transmit an indication of configuration information for a random access message of a random access procedure, the configuration information being associated with an aggregated set of preamble sequences related to one or more preamble occasions and an aggregated set of demodulation reference signal (DMRS) sequences and physical uplink shared channel (PUSCH) occasions for the random access message related to one or more PUSCH occasions;

map, in accordance with the configuration information, the aggregated set of preamble sequences to the aggregated set of DMRS sequences and PUSCH occasions, wherein, to map the aggregated set of preamble sequences to the aggregated set of DMRS sequences and PUSCH occasions, the instructions are further executable by the processor to cause the apparatus to:

order preamble sequences for a first group of preamble occasions associated with the aggregated set of preamble sequences in accordance with preamble sequence identifiers;

order DMRS sequences for a second group of PUSCH occasions associated with the aggregated set of DMRS sequences and PUSCH occasions in accordance with DMRS sequence identifiers; and map one or more preamble sequences of the first group of preamble occasions to one or more DMRS sequences of the second group of PUSCH occasions, wherein a quantity of PUSCH occasions of the second group of PUSCH occasions is based at least in part on a resource allocation information corresponding to the random access message for the one or more PUSCH occasions; and transmit, to a user equipment, an indication of the mapping of the one or more preamble sequences of the first group of preamble occasions to the one or more DMRS sequences of the second group of PUSCH occasions.

29. An apparatus for wireless communications at a user equipment, comprising:

a processor, memory in electronic communication with the processor; and instructions stored in the memory and executable by the processor to cause the apparatus to:

receive, from a network device, an indication of a mapping of an aggregated set of preamble sequences related to one or more preamble occasions to an aggregated set of demodulation reference signal (DMRS) sequences and physical uplink shared channel (PUSCH) occasions for of a random access message of a random access procedure;

order, in accordance with the indicated mapping, preamble sequences for a first group of preamble occasions associated with the aggregated set of preamble sequences in accordance with preamble sequence identifiers;

order, in accordance with the indicated mapping, DMRS sequences for a second group of PUSCH occasions associated with the aggregated set of DMRS sequence identifiers;

map one or more preamble sequences of the fall first group of preamble occasions to one or more DMRS sequences of the second group of PUSCH occasions in accordance with the indicated mapping, wherein a quantity of PUSCH occasions of the second group of PUSCH occasions is based at least in part on a resource allocation information corresponding to the random access message for the one or more PUSCH occasions; and transmit, in accordance with the mapping of the one or more preamble sequences of the first group of preamble occasions to the one or more DMRS sequences of the second group of PUSCH occasions, at least one preamble sequence of the aggregated set of preamble sequences in a preamble occasion of the first group of preamble occasions and at least one DMRS sequence of the aggregated set of DMRS sequences in a PUSCH occasion of the second group of PUSCH occasions.

* * * * *